(12) United States Patent
Xin et al.

(10) Patent No.: US 12,212,966 B2
(45) Date of Patent: Jan. 28, 2025

(54) TERMINAL INFORMATION PROCESSING METHOD AND APPARATUS, AND SYSTEM

(71) Applicant: HUAWEI TECHNOLOGIES CO., LTD., Guangdong (CN)

(72) Inventors: Yang Xin, Shanghai (CN); Li Hu, Shanghai (CN); Xiaobo Wu, Shenzhen (CN); Weiwei Chong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 335 days.

(21) Appl. No.: 17/520,716

(22) Filed: Nov. 8, 2021

(65) Prior Publication Data
US 2022/0060903 A1 Feb. 24, 2022

Related U.S. Application Data

(63) Continuation of application No. PCT/CN2020/087873, filed on Apr. 29, 2020.

(30) Foreign Application Priority Data

May 7, 2019 (CN) .......................... 201910377223.2

(51) Int. Cl.
*H04W 12/108* (2021.01)
*H04W 12/68* (2021.01)
(Continued)

(52) U.S. Cl.
CPC ......... *H04W 12/108* (2021.01); *H04W 12/68* (2021.01); *H04W 48/16* (2013.01); *H04W 48/20* (2013.01)

(58) Field of Classification Search
CPC ... H04W 12/108; H04W 12/68; H04W 48/16; H04W 48/20; H04W 12/121;
(Continued)

(56) References Cited

U.S. PATENT DOCUMENTS

2008/0271146 A1  10/2008 Rooney et al.
2012/0069748 A1*  3/2012 Van Den Bogaert ......................
                                         H04W 36/0088
                                         370/252
(Continued)

FOREIGN PATENT DOCUMENTS

CN    104519031 A    4/2015
CN    103220700 B    8/2016
(Continued)

OTHER PUBLICATIONS

3GPP TR 23.791 V16.1.0 (Mar. 2019), 3rd Generation Partnership Project; Technical Specification Group Services and System Aspects; Study of Enablers for Network Automation for 5G(Release 16), 124 pages.
3GPP TR 23.791 V2.0.0 (Dec. 2018), 3rd Generation Partnership Project; Technical Specification Group Services and System Aspects; Study of Enablers for Network Automation for 5G(Release 16), 121 pages.
(Continued)

*Primary Examiner* — Michael A Keller

(57) ABSTRACT

Embodiments of this application provide a terminal information processing method for determining exception information of a terminal. The method includes: obtaining, by a data analytics network element, data of a first terminal on an application function network element, where the data includes exception information of the first terminal; obtaining, by the data analytics network element, first terminal information of the first terminal on one or more network elements; and determining, by the data analytics network element, exception information of a second terminal based on the exception information of the first terminal and the first terminal information.

20 Claims, 8 Drawing Sheets

(51) Int. Cl.
  *H04W 48/16* (2009.01)
  *H04W 48/20* (2009.01)
(58) Field of Classification Search
  CPC ............ H04W 24/04; H04W 12/009; H04L
        41/0894; H04L 41/142; H04L 41/16;
        H04L 63/1425; G06F 18/214; G06F
        18/23213; G06F 18/24
  See application file for complete search history.

(56) References Cited

U.S. PATENT DOCUMENTS

| | | | |
|---|---|---|---|
| 2015/0319744 A1* | 11/2015 | Jung | H04W 72/20 |
| | | | 370/328 |
| 2016/0261465 A1 | 9/2016 | Gupta et al. | |
| 2017/0034860 A1 | 2/2017 | Berggren et al. | |
| 2018/0054804 A1* | 2/2018 | Luo | H04W 4/023 |
| 2018/0063195 A1* | 3/2018 | Nimmagadda | H04L 63/0263 |
| 2018/0247220 A1 | 8/2018 | Assem Aly Salama et al. | |
| 2018/0332061 A1* | 11/2018 | Terada | G06F 21/552 |
| 2020/0092747 A1* | 3/2020 | Kumar | H04W 28/02 |
| 2021/0112404 A1* | 4/2021 | Xin | H04M 15/58 |
| 2022/0400381 A1* | 12/2022 | Bolle | H04W 12/106 |
| 2023/0351245 A1* | 11/2023 | Subramanya | G06N 20/00 |

FOREIGN PATENT DOCUMENTS

| | | |
|---|---|---|
| CN | 108563548 A | 9/2018 |
| CN | 108718296 A | 10/2018 |
| CN | 109474483 A | 3/2019 |
| CN | 109698760 A | 4/2019 |
| JP | 2018078546 A | 5/2018 |
| WO | 2017004789 A1 | 1/2017 |

OTHER PUBLICATIONS

Ericsson, Reporting UPF measurements to NWDAF. SA WG2 Meeting #132 , Xi an, China, Apr. 8-12, 2019, S2-1903297, 3 pages.
China Mobile, NEC, TS 23.288 Performance Improvement and Supervision of general mode for mIoT Terminals. 3GPP TSG-SA WG2 Meeting #130, Jan. 21-25, 2019, Kochi, India, S2-1900504, 8 pages.
CATT, Performance Improvement and Supervision of general mode for mIoT Terminals. 3GPP TSG-SA WG2 Meeting #130, Jan. 21-25, 2019, Kochi, India, S2-1900536, 10 pages.
CATT, ATandT, Supervision of IoT devices for risk precaution. 3GPP TSG-SA WG2 Meeting #129, Oct. 15-19, 2018, Dongguan, P. R. China, S2-1810534, 4 pages.
3GPP TS 23.288 V0.4.0 3rd Generation Partnership Project;Technical Specification Group Services and System Aspects;Architecture enhancements for 5G System (5GS) to supportnetwork data analytics services(Release 16) Apr. 2019 total 48 pages.
SA WG2 Meeting #132, S2-1903805,General Solution proposal for Data Correlation,China Mobile,Apr. 8-12, 2019, Xi an, China,total 5 pages.
NEC, eNA KI-8 Solution 21 Addition of a new UE abnormal behaviour monitoring event. SA WG2 Meeting #129bis, Nov. 26-30, 2018, West Palm Beach, USA , S2-1813214, 5 pages.
3GPP Draft; TS 23.288 V0.5.0:3rd Generation Partnership Project; Technical Specification Group Services and System Aspects; Architecture enhancements for 5G System (5GS) to support network data analytics services (Release 16) May 30, 2019,total 52 pages.
3GPP TS 23.502, V16.0.2, Anonymous: 3rd Generation Partnership Project;Technical Specification Group Services and System Aspects;Procedures for the 5G System; Stage 2 (Release 16) Apr. 2019,total 419 pages.

* cited by examiner

TERMINAL INFORMATION PROCESSING METHOD AND APPARATUS, AND SYSTEM

CROSS-REFERENCE TO RELATED APPLICATION

This application is a continuation of International Application No. PCT/CN2020/087873, filed on Apr. 29, 2020, which claims priority to Chinese Patent Application No. 201910377223.2, filed on May 7, 2019. The disclosure of the aforementioned applications are hereby incorporated by reference in their entireties

TECHNICAL FIELD

Embodiments of this application relate to the field of communications technologies, and in particular, to a terminal information processing method and apparatus, and a system.

BACKGROUND

A large quantity of internet of things (IoT) terminals may be introduced into a 5th-generation (5G) network. If these IoT terminals are attacked by viruses on a large scale, are hijacked, or are incorrectly used, the 5G network is greatly affected. For example, network congestion, abnormal access to a network device, and a network security issue are caused.

Therefore, a carrier network needs to have a capability of identifying an IoT terminal exception, so that the carrier network can correspondingly handle an abnormal IoT terminal.

SUMMARY

Embodiments of this application provide a terminal information processing method and apparatus, and a system, to determine exception information of a terminal.

To achieve the foregoing objective, the following technical solutions are used in this application:

According to a first aspect, an embodiment of this application provides a terminal information processing method, including: obtaining, by a data analytics network element, data of a first terminal on an application function network element, where the data includes exception information of the first terminal: obtaining, by the data analytics network element, first terminal information of the first terminal on one or more network elements; and determining, by the data analytics network element, exception information of a second terminal based on the exception information of the first terminal and the first terminal information.

In the terminal information processing method provided in this embodiment of this application, the data analytics network element obtains the exception information of the first terminal on the application function network element, where the exception information may be used to reflect that the first terminal is in an abnormal state. Therefore, the data analytics network element may obtain a training data set based on the exception information of the first terminal and the first terminal information of the first terminal on the one or more network elements. For example, the training data set may include some first terminal information associated with the exception information in the first terminal information and some first terminal information not associated with the exception information in the first terminal information. Therefore, after obtaining the training data set, the data analytics network element quickly and accurately determines the exception information of the second terminal based on the training data set.

In a possible implementation, the determining, by the data analytics network element, exception information of a second terminal based on the exception information of the first terminal and the first terminal information includes: determining, by the data analytics network element, terminal classification information based on the exception information of the first terminal and the first terminal information; and determining, by the data analytics network element, the exception information of the second terminal based on the terminal classification information and second terminal information of the second terminal. The terminal classification information is used to: determine whether the second terminal information obtained by the data analytics network element in real time is in an abnormal state, and determine an exception type of the second terminal when it is determined that the second terminal information is in an abnormal state.

In a possible implementation, the determining, by the data analytics network element, exception information of a second terminal based on the exception information of the first terminal and the first terminal information includes: determining, by the data analytics network element based on the exception information of the first terminal and the first terminal information, unexpected terminal behavior information that is from a network side and that corresponds to the exception information; and determining, by the data analytics network element, the exception information of the second terminal based on the unexpected terminal behavior information that is from the network side and that corresponds to the exception information and second terminal information of the second terminal. In this way, the exception information of the second terminal is determined based on a similarity between the unexpected terminal behavior information that is from the network side and the second terminal information.

In a possible implementation, the determining, by the data analytics network element, the exception information of the second terminal based on the unexpected terminal behavior information that is from the network side and that corresponds to the exception information and second terminal information of the second terminal includes: determining, by the data analytics network element, the exception information of the second terminal when the similarity between the second terminal information and the unexpected terminal behavior information that is from the network side is greater than or equal to a first threshold. Because the unexpected terminal behavior information that is from the network side is determined based on the exception information and the first terminal information, if the similarity between the second terminal information and the unexpected terminal behavior information that is from the network side is high, it indicates that the second terminal is in an abnormal state.

In a possible implementation, the method provided in this embodiment of this application further includes: determining, by the data analytics network element based on the exception information and the first terminal information, expected terminal behavior information that is from the network side, where the expected terminal behavior information that is from the network side is terminal information that is in the first terminal information and that is not associated with the exception information. If some terminal information in the first terminal information is not associated with the exception information, it indicates that the some terminal information is in a normal state. In other words, filtering is performed on the first terminal information based on the exception information, so that the first terminal information is classified into terminal information of a normal type and terminal information of an exception type. After the filtering, expected terminal behavior information that is from the network side and that is learned based on the terminal information in the normal state may be more accurate.

In a possible implementation, the method provided in this embodiment of this application further includes: sending, by the data analytics network element to a network element, the expected terminal behavior information that is from the network side.

In a possible implementation, the method provided in this embodiment of this application further includes: sending, by the data analytics network element to the network element, the unexpected terminal behavior information that is from the network side. In this way, after obtaining one piece of second terminal information of the second terminal, the network element can determine, based on the unexpected terminal behavior information that is from the network side, whether the second terminal is in an abnormal state.

In a possible implementation, the exception information includes any one or more of the following information: an exception type, an exception identifier, an exception level, and additional information, where the exception identifier is used to identify the exception type, the exception level is used to reflect an exception degree of the exception type, and the additional information is used to indicate description information of the exception type.

In a possible implementation, the exception information is exception information of a flow of the first terminal.

In a possible implementation, the data of the first terminal on the application function network element may further include any one or more of the following information corresponding to the first terminal: a service identifier of a service corresponding to the flow, a terminal type, and a first identifier.

In a possible implementation, the first identifier includes at least one of the following information: an internet protocol IP 5-tuple, an identifier of the first terminal, an identifier of a user plane network element, the service identifier, an identifier of a service server, and an identifier of the application function network element.

For example, the IP 5-tuple may be used to identify a service flow of a terminal. The IP 5-tuple includes an IP address of the terminal, a port of the terminal, an IP address of the service server, a port number of the service server, and a transport layer protocol of the service.

In a possible implementation, the first terminal information of the first terminal on the one or more network elements also includes the first identifier. The method provided in this embodiment of this application further includes: associating, by the data analytics network element, the data of the first terminal on the application function network element with the first terminal information by using the first identifier.

According to a second aspect, an embodiment of this application provides a terminal information processing method, including: obtaining, by a network element, second terminal information of a second terminal: determining, by the network element based on the second terminal information, that the second terminal is in an abnormal state; and sending, by the network element, the second terminal information to a data analytics network element.

In a possible implementation, the method provided in this embodiment of this application further includes: receiving, by the network element from the data analytics network element, unexpected terminal behavior information that is from a network side, where the unexpected terminal behavior information that is from the network side is terminal information that is in first terminal information and that is associated with exception information. In this way, the network element determines, based on the unexpected terminal behavior information that is from the network side, that the second terminal is in an abnormal state.

In a possible implementation, the determining, by the network element based on the second terminal information, that the second terminal is in an abnormal state includes: determining, by the network element based on the second terminal information and the unexpected terminal behavior information that is from the network side, that the second terminal is in an abnormal state.

In a possible implementation, the determining, by the network element based on the second terminal information and the unexpected terminal behavior information that is from the network side, that the second terminal is in an abnormal state includes: determining, by the network element, that the second terminal is in an abnormal state when a similarity between the second terminal information and the unexpected terminal behavior information that is from the network side is greater than or equal to a first threshold. Because the unexpected terminal behavior information that is from the network side is determined based on exception information obtained from an application function network element, if the similarity between the second terminal information of the second terminal and the unexpected terminal behavior information that is from the network side is greater than or equal to the first threshold, it indicates that the second terminal information includes the exception information, and therefore, it may be determined that the second terminal is in an abnormal state.

In a possible implementation, when an error between a second vector corresponding to the unexpected terminal behavior information that is from the network side and a first vector corresponding to the second terminal information is less than a first preset error, the similarity is greater than or equal to the first threshold.

In a possible implementation, when an error between 0 and an included angle between a first vector corresponding to the second terminal information and a second vector corresponding to the unexpected terminal behavior information that is from the network side is less than a second preset error, the similarity is greater than or equal to the first threshold.

In a possible implementation, the method provided in this embodiment of this application further includes: receiving, by the network element from the data analytics network element, expected terminal behavior information that is from the network side, where the expected terminal behavior information that is from the network side is terminal information that is in the first terminal information and that is associated with the exception information.

In a possible implementation, the determining, by the network element based on the second terminal information, that the second terminal is in an abnormal state includes: determining, by the network element based on the second terminal information and the expected terminal behavior information that is from the network side, that the second terminal is in an abnormal state.

In a possible implementation, the determining, by the network element based on the second terminal information, that the second terminal is in an abnormal state includes: determining, by the network element, that the second terminal is in an abnormal state when a similarity between the second terminal information and the expected terminal behavior information that is from the network side is less than or equal to a second threshold.

In a possible implementation, if a cosine value between the first vector corresponding to the second terminal information and a third vector corresponding to the expected terminal behavior information that is from the network side is less than 0.5, or an included angle between the first vector and the third vector is greater than or equal to a preset angle, the similarity is less than or equal to the second threshold.

According to a third aspect, an embodiment of this application provides a terminal information processing method, including: obtaining, by an application function network element, data of a first terminal on the application function network element, where the data includes exception information of the first terminal; and sending, by the application function network element, the data to a data analytics network element, where the data is used by the data analytics network element to determine exception information of a second terminal.

In a possible implementation, the exception information includes any one or more of the following information: an exception type, an exception identifier, an exception level, and additional information, where the exception identifier is used to identify the exception type, the exception level is used to reflect an exception degree of the exception type, and the additional information is used to indicate description information of the exception type.

In a possible implementation, the exception information is exception information of a flow of the first terminal.

In a possible implementation, the data of the first terminal on the application function network element may further include any one or more of the following information corresponding to the first terminal: a service identifier of a service corresponding to the flow, a terminal type, and a first identifier.

In a possible implementation, the first identifier includes at least one of the following information: an internet protocol IP 5-tuple, an identifier of the first terminal, an identifier of a user plane network element, the service identifier, an identifier of a service server, and an identifier of the application function network element.

According to a fourth aspect, this application provides a terminal information processing apparatus. The terminal information processing apparatus may implement the method according to any one of the first aspect or the possible implementations of the first aspect, and therefore can also achieve beneficial effects according to any one of the first aspect or the possible implementations of the first aspect. The terminal information processing apparatus may be a data analytics network element, or may be an apparatus that can support a data analytics network element in implementing the method according to any one of the first aspect or the possible implementations of the first aspect, for example, a chip applied to the data analytics network element. The apparatus may implement the foregoing method by using software or hardware, or by hardware executing corresponding software.

In an example, the terminal information processing apparatus includes: a communications unit, configured to obtain data of a first terminal on an application function network element, where the data includes exception information of the first terminal, where the communications unit is further configured to obtain first terminal information of the first terminal on one or more network elements; and a processing unit, configured to determine exception information of a second terminal based on the exception information of the first terminal and the first terminal information.

In a possible implementation, the processing unit is configured to determine terminal classification information based on the exception information of the first terminal and the first terminal information; and the processing unit is configured to determine the exception information of the second terminal based on the terminal classification information and second terminal information of the second terminal.

In a possible implementation, the processing unit is configured to determine, based on the exception information of the first terminal and the first terminal information, unexpected terminal behavior information that is from a network side and that corresponds to the exception information; and the processing unit is configured to determine the exception information of the second terminal based on the unexpected terminal behavior information that is from the network side and that corresponds to the exception information and second terminal information of the second terminal.

In a possible implementation, the processing unit is configured to determine the exception information of the second terminal when a similarity between the second terminal information and the unexpected terminal behavior information that is from the network side is greater than or equal to a first threshold.

In a possible implementation, the processing unit is further configured to determine, based on the exception information and the first terminal information, expected terminal behavior information that is from the network side, where the expected terminal behavior information that is from the network side is terminal information that is in the first terminal information and that is not associated with the exception information.

In a possible implementation, the communications unit is further configured to send, to a network element, the expected terminal behavior information that is from the network side.

In a possible implementation, the communications unit is further configured to send, to the network element, the unexpected terminal behavior information that is from the network side.

In a possible implementation, the exception information includes any one or more of the following information: an exception type, an exception identifier, an exception level, and additional information, where the exception identifier is used to identify the exception type, the exception level is used to reflect an exception degree of the exception type, and the additional information is used to indicate description information of the exception type.

In a possible implementation, the exception information is exception information of a flow of the first terminal.

In a possible implementation, the data of the first terminal on the application function network element may further include any one or more of the following information corresponding to the first terminal: a service identifier of a service corresponding to the flow, a terminal type, and a first identifier.

In a possible implementation, the first identifier includes at least one of the following information: an internet protocol IP 5-tuple, an identifier of the first terminal, an identifier of a user plane network element, the service identifier, an identifier of a service server, and an identifier of the application function network element.

For example, the IP 5-tuple may be used to identify a service flow of a terminal. The IP 5-tuple includes an IP address of the terminal, a port of the terminal, an IP address of the service server, a port number of the service server, and a transport layer protocol of the service.

In another example, an embodiment of this application provides a terminal information processing apparatus. The terminal information processing apparatus may be a data analytics network element, or may be a chip in a data analytics network element. The terminal information processing apparatus may include a communications unit and a processing unit. When the terminal information processing apparatus is a data analytics network element, the communications unit may be a communications interface or an interface circuit, and the processing unit may be a processor. The processing unit executes an instruction stored in a storage unit, so that the terminal information processing apparatus implements the method described in any one of the first aspect or the possible implementations of the first aspect. When the terminal information processing apparatus is a chip in a data analytics network element, the processing unit may be a processor, and the communications unit may be referred to as a communications interface.

Optionally; the processor, the communications interface, and the storage unit are coupled to each other.

According to a fifth aspect, this application provides a terminal information processing apparatus. The terminal information processing apparatus may implement the method according to any one of the second aspect or the possible implementations of the second aspect, and therefore can also achieve beneficial effects according to any one of the second aspect or the possible implementations of the second aspect. The terminal information processing apparatus may be a network element, or may be an apparatus that can support a network element in implementing the method according to any one of the second aspect or the possible implementations of the second aspect, for example, a chip applied to the data analytics network element. The apparatus may implement the foregoing method by using software or hardware, or by hardware executing corresponding software.

In an example, an embodiment of this application provides a terminal information processing apparatus, including: a communications unit, configured to obtain second terminal information of a second terminal: a processing unit, configured to determine, based on the second terminal information, that the second terminal is in an abnormal state; and a sending unit, configured to send the second terminal information to a data analytics network element.

In a possible implementation, the communications unit is further configured to receive, from the data analytics network element, unexpected terminal behavior information that is from a network side, where the unexpected terminal behavior information that is from the network side is terminal information that is in first terminal information and that is associated with exception information. In this way, the network element determines, based on the unexpected terminal behavior information that is from the network side, that the second terminal is in an abnormal state.

In a possible implementation, the processing unit is configured to determine, based on the second terminal information and the unexpected terminal behavior information that is from the network side, that the second terminal is in an abnormal state.

In a possible implementation, the processing unit is configured to determine that the second terminal is in an abnormal state when a similarity between the second terminal information and the unexpected terminal behavior information that is from the network side is greater than or equal to a first threshold.

In a possible implementation, when an error between a second vector corresponding to the unexpected terminal behavior information that is from the network side and a first vector corresponding to the second terminal information is less than a first preset error, the similarity is greater than or equal to the first threshold.

In a possible implementation, when an error between 0 and an included angle between a first vector corresponding to the second terminal information and a second vector corresponding to the unexpected terminal behavior information that is from the network side is less than a second preset error, the similarity is greater than or equal to the first threshold.

In a possible implementation, the communications unit is further configured to receive, from the data analytics network element, expected terminal behavior information that is from the network side, where the expected terminal behavior information that is from the network side is terminal information that is in the first terminal information and that is associated with the exception information.

In a possible implementation, the processing unit is configured to determine, based on the second terminal information and the expected terminal behavior information that is from the network side, that the second terminal is in an abnormal state.

In a possible implementation, the processing unit is configured to determine that the second terminal is in an abnormal state when a similarity between the second terminal information and the expected terminal behavior information that is from the network side is less than or equal to a second threshold.

In a possible implementation, if a cosine value between the first vector corresponding to the second terminal information and a third vector corresponding to the expected terminal behavior information that is from the network side is less than 0.5, or an included angle between the first vector and the third vector is greater than or equal to a preset angle, the similarity is less than or equal to the second threshold.

In another example, an embodiment of this application provides a terminal information processing apparatus. The terminal information processing apparatus may be a network element, or may be a chip in a network element. The terminal information processing apparatus may include a communications unit and a processing unit. When the terminal information processing apparatus is a data analytics network element, the communications unit may be a communications interface or an interface circuit, and the processing unit may be a processor. The processing unit executes an instruction stored in the storage unit, so that the terminal information processing apparatus implements the method described in any one of the second aspect or the possible implementations of the second aspect. When the terminal information processing apparatus is a chip in a network element, the processing unit may be a processor, and the communications unit may be referred to as a communications interface.

Optionally, the processor, the communications interface, and the storage unit are coupled to each other.

According to a sixth aspect, this application provides a terminal information processing apparatus. The terminal information processing apparatus may implement the method according to any one of the third aspect or the possible implementations of the third aspect, and therefore can achieve beneficial effects according to any one of the third aspect or the possible implementations of the third aspect. The terminal information processing apparatus may be an application function network element, or may be an apparatus that can support an application function network element in implementing the method according to any one of the third aspect or the possible implementations of the third aspect, for example, a chip applied to the application function network element. The apparatus may implement the foregoing method by using software or hardware, or by hardware executing corresponding software.

In an example, an embodiment of this application provides a terminal information processing apparatus, including: a communications unit, configured to obtain data of a first terminal on an application function network element, where the data includes exception information of the first terminal; and send the data to a data analytics network element, where the data is used by the data analytics network element to determine exception information of a second terminal.

In a possible implementation, the exception information includes any one or more of the following information: an exception type, an exception identifier, an exception level, and additional information, where the exception identifier is used to identify the exception type, the exception level is used to reflect an exception degree of the exception type, and the additional information is used to indicate description information of the exception type.

In a possible implementation, the exception information is exception information of a flow of the first terminal.

In a possible implementation, the data of the first terminal on the application function network element may further include any one or more of the following information corresponding to the first terminal: a service identifier of a service corresponding to the flow, a terminal type, and a first identifier.

In a possible implementation, the first identifier includes at least one of the following information: an internet protocol IP 5-tuple, an identifier of the first terminal, an identifier of a user plane network element, the service identifier, an identifier of a service server, and an identifier of the application function network element.

In another example, an embodiment of this application provides a terminal information processing apparatus. The terminal information processing apparatus may be an application function network element, or may be a chip in an application function network element. The terminal information processing apparatus may include a communications unit and a processing unit. When the terminal information processing apparatus is an application function network element, the communications unit may be a communications interface or an interface circuit, and the processing unit may be a processor. The processing unit executes an instruction stored in the storage unit, so that the terminal information processing apparatus implements the method described in any one of the third aspect or the possible implementations of the third aspect. When the terminal information processing apparatus is a chip in a network element, the processing unit may be a processor, and the communications unit may be referred to as a communications interface.

Optionally, the processor, the communications interface, and the storage unit are coupled to each other.

According to a seventh aspect, an embodiment of this application provides a computer-readable storage medium. The computer-readable storage medium stores a computer program or an instruction. When the computer program or the instruction is run on a computer, the computer is enabled to perform the terminal information processing method described in any one of the first aspect or the possible implementations of the first aspect.

According to an eighth aspect, an embodiment of this application provides a computer-readable storage medium. The computer-readable storage medium stores a computer program or an instruction. When the computer program or the instruction is run on a computer, the computer is enabled to perform the terminal information processing method described in any one of the second aspect or the possible implementations of the second aspect.

According to a ninth aspect, an embodiment of this application provides a computer-readable storage medium. The computer-readable storage medium stores a computer program or an instruction. When the computer program or the instruction is run on a computer, the computer is enabled to perform the terminal information processing method described in any one of the third aspect or the possible implementations of the third aspect.

According to a tenth aspect, an embodiment of this application provides a computer program product including an instruction. When the computer program product runs on a computer, the computer is enabled to perform the terminal information processing method described in the first aspect or the possible implementations of the first aspect.

According to an eleventh aspect, this application provides a computer program product including an instruction. When the computer program product runs on a computer, the computer is enabled to perform the terminal information processing method described in the second aspect or the possible implementations of the second aspect.

According to a twelfth aspect, this application provides a computer program product including an instruction. When the computer program product runs on a computer, the computer is enabled to perform the terminal information processing method described in the third aspect or the possible implementations of the third aspect.

According to a thirteenth aspect, an embodiment of this application provides a communications system. The communications system includes: the terminal information processing apparatus described in the fourth aspect and the possible implementations of the fourth aspect.

In a possible implementation, the system may further include the terminal information processing apparatus described in the fifth aspect and the possible implementations of the fifth aspect, and the terminal information processing apparatus described in the sixth aspect and the possible implementations of the sixth aspect.

According to a fourteenth aspect, an embodiment of this application provides a communications apparatus. The communications apparatus includes a processor and a storage medium, the storage medium stores an instruction, and when the instruction is run by the processor, the terminal information processing method described in the first aspect or the possible implementations of the first aspect is implemented.

According to a fifteenth aspect, an embodiment of this application provides a communications apparatus. The communications apparatus includes a processor and a storage medium, the storage medium stores an instruction, and when the instruction is run by the processor, the terminal information processing method described in the second aspect or the possible implementations of the second aspect is implemented.

According to a sixteenth aspect, an embodiment of this application provides a communications apparatus. The communications apparatus includes a processor and a storage medium, the storage medium stores an instruction, and when the instruction is run by the processor, the terminal information processing method described in the third aspect or the possible implementations of the third aspect is implemented.

According to a seventeenth aspect, an embodiment of this application provides a communications apparatus. The communications apparatus includes a processor and a storage medium, the storage medium stores an instruction, and when the instruction is run by the processor, the terminal information processing method described in the fourth aspect or the possible implementations of the fourth aspect is implemented.

According to an eighteenth aspect, an embodiment of this application provides a communications apparatus. The communications apparatus includes one or more modules, configured to implement the methods in the first aspect, the second aspect, and the third aspect, and the one or more modules may correspond to the steps in the methods in the first aspect, the second aspect, and the third aspect.

According to a nineteenth aspect, an embodiment of this application provides a chip. The chip includes a processor and a communications interface. The communications interface is coupled to the processor. The processor is configured to run a computer program or an instruction, to implement the terminal information processing method described in the first aspect or the possible implementations of the first aspect. The communications interface is configured to communicate with another module outside the chip.

According to a twentieth aspect, an embodiment of this application provides a chip. The chip includes a processor and a communications interface. The communications interface is coupled to the processor. The processor is configured to run a computer program or an instruction, to implement the terminal information processing method described in the second aspect or the possible implementations of the second aspect. The communications interface is configured to communicate with another module outside the chip.

According to a twenty-first aspect, an embodiment of this application provides a chip. The chip includes a processor and a communications interface. The communications interface is coupled to the processor. The processor is configured to run a computer program or an instruction, to implement the terminal information processing method described in the third aspect or the possible implementations of the third aspect. The communications interface is configured to communicate with another module outside the chip.

The chip provided in this embodiment of this application further includes a memory, configured to store the computer program or the instruction.

According to a twenty-second aspect, an embodiment of this application provides a communications apparatus, including a processor. The processor communicates with a memory, the memory is configured to store a computer-executable instruction, and when the communications apparatus runs, the processor executes the computer-executable instruction stored in the memory, so that the communications apparatus implements the terminal information processing method described in the first aspect or the possible implementations of the first aspect.

According to a twenty-third aspect, an embodiment of this application provides a communications apparatus, including a processor. The processor communicates with a memory, the memory is configured to store a computer-executable instruction, and when the communications apparatus runs, the processor executes the computer-executable instruction stored in the memory, so that the communications apparatus implements the terminal information processing method described in the second aspect or the possible implementations of the second aspect.

According to a twenty-fourth aspect, an embodiment of this application provides a communications apparatus, including a processor. The processor communicates with a memory, the memory is configured to store a computer-executable instruction, and when the communications apparatus runs, the processor executes the computer-executable instruction stored in the memory, so that the communications apparatus implements the terminal information processing method described in the third aspect or the possible implementations of the third aspect.

According to a twenty-fifth aspect, an embodiment of this application provides a processor, configured to implement the terminal information processing method described in the first aspect or the possible implementations of the first aspect.

According to a twenty-sixth aspect, an embodiment of this application provides a processor, configured to implement the terminal information processing method described in the second aspect or the possible implementations of the second aspect.

According to a twenty-seventh aspect, an embodiment of this application provides a processor, configured to implement the terminal information processing method described in the third aspect or the possible implementations of the third aspect.

According to a twenty-eighth aspect, an embodiment of this application provides an apparatus, configured to implement the terminal information processing method described in the first aspect or the possible implementations of the first aspect.

According to a twenty-ninth aspect, an embodiment of this application provides an apparatus, configured to implement the terminal information processing method described in the second aspect or the possible implementations of the second aspect.

According to a thirtieth aspect, an embodiment of this application provides an apparatus, configured to implement the terminal information processing method described in the third aspect or the possible implementations of the third aspect.

Any apparatus, computer storage medium, computer program product, chip, or communications system provided above is configured to perform the corresponding method provided above. Therefore, for beneficial effects that can be achieved by the apparatus, computer storage medium, computer program product, chip, or communications system provided above, refer to beneficial effects of a corresponding solution in the corresponding method provided above. Details are not described herein again.

DESCRIPTION OF EMBODIMENTS

Figure 1:
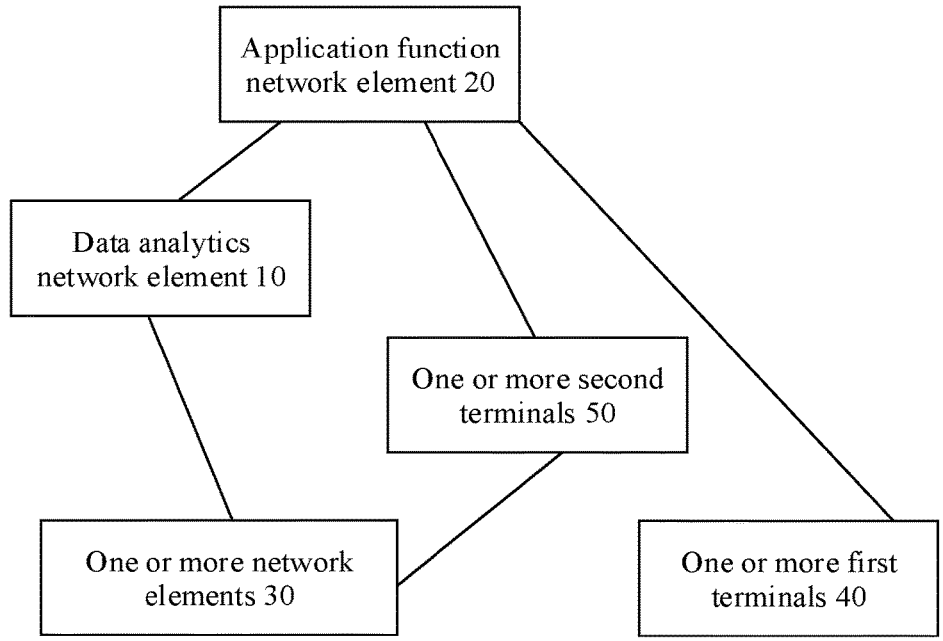
FIG. 1 is a system architecture diagram of a communications system according to an embodiment of this application.

To clearly describe the technical solutions in the embodiments of this application, terms such as "first" and "second" are used in the embodiments of this application to distinguish between same items or similar items that have basically same functions and purposes. For example, a first terminal and a second terminal are merely intended to distinguish between different terminals, and are not intended to limit a sequence thereof. A person skilled in the art may understand that the terms such as "first" and "second" do not limit a quantity or an execution sequence, and that the terms such as "first" and "second" do not indicate a definite difference.

It should be noted that, in this application, the word "for example" or "example" is used to represent giving an example, an illustration, or a description. Any embodiment or design scheme described as an "for example" or "example" in this application should not be explained as being more preferred or having more advantages than another embodiment or design scheme. Exactly, use of the word "for example", "example", or the like is intended to present a relative concept in a specific manner.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

In this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one of the following" or a similar expression thereof indicates any combination of the following, including any combination of one or more of the following. For example, at least one (one piece) of a, b, or c may indicate: a, b, c, a-b, a-c, b-c, or a-b-c, where a, b, and c may be singular or plural.

The technical solutions in the embodiments of this application may be applied to various communications systems, for example, code division multiple access (CDMA), time division multiple access (TDMA), frequency division multiple access (FDMA), orthogonal frequency division multiple access (OFDMA), single carrier frequency division multiple access (SC-FDMA), and another system. The terms "system" and "network" can be interchanged with each other. The CDMA system can implement wireless technologies such as universal terrestrial radio access (UTRA) and CDMA2000. UTRA may include a wideband CDMA (WCDMA) technology and another technology transformed from CDMA. CDMA2000 may cover interim standard (IS) 2000 (IS-2000), IS-95, and IS-856. The TDMA system can implement wireless technologies such as global system for mobile communications (GSM). The OFDMA system can implement wireless technologies such as evolved universal terrestrial radio access (E-UTRA), ultra mobile broadband (UMB), IEEE 802.11 (Wi-Fi), IEEE 802.16 (WiMAX), IEEE 802.20, and Flash OFDMA. UTRA corresponds to UMTS, and E-UTRA corresponds to an evolved version of UMTS. A new version of UMTS, namely, E-UTRA, is used in 3GPP long term evolution (LTE) and various versions evolved based on LTE. A 5G communications system and a new radio (NR) communications system are next-generation communications systems under research. In addition, the communications system is further applicable to a future-oriented communications technology, and is applicable to the technical solutions provided in the embodiments of this application.

The system architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems. In the embodiments of this application, an example in which the provided method is applied to the NR system or the 5G network is used for description.

FIG. 1 shows a communications system according to an embodiment of this application. The communications system includes a data analytics network element 10, an application function (AF) network element 20 communicating with the data analytics network element 10, and one or more network elements 30 communicating with the data analytics network element 10.

In a possible embodiment, the communications system may further include one or more first terminals 40 and one or more second terminals 50. The one or more first terminals 40 and the one or more second terminals 50 communicate with the data analytics network element 10, the one or more network elements 30, and the application function network element 20.

For example, the one or more first terminals 40 may be terminals corresponding to a big data model training phase, and the at least one second terminal 50 may be terminals corresponding to a specific model application phase.

For example, the one or more network elements 30 may be any one or more of the first terminals 40, network management network elements, core network elements in a core network, or access network elements in an access network.

For example, the core network element may be any one or more of a session management network element, a mobility management network element, a policy control network element, an application function network element, or a user plane network element.

The one or more network elements 30 are configured to provide the data analytics network element 10 with first terminal information that corresponds to the first terminal 40 and that is on the one or more network elements 30. In addition, the one or more network elements 30 may further provide the data analytics network element 10 with second terminal information of the second terminal 50 on the one or more network elements 30.

It should be noted that the one or more network elements 30 that provide the first terminal information may be the same as or different from the one or more network elements 30 that provide the second terminal information. This is not limited in this embodiment of this application. For example, a mobility management network element A provides the first terminal information of the first terminal 40 for the data analytics network element 10, and a mobility management network element B provides the second terminal information of the second terminal 50 for the data analytics network element 10.

In this embodiment of this application, first terminal information that corresponds to a same first terminal 40 and that is on different network elements may be the same or may be different. Second terminal information that corresponds to a same second terminal 50 and that is on different network elements may be the same or may be different.

In this embodiment of this application, the first terminal information may be first terminal behavior data or first terminal behavior information, and the second terminal information may be second terminal behavior data or second terminal behavior information. In this embodiment of this application, terminal information of a terminal may also be terminal behavior information of the terminal.

The application function network element 20 is configured to provide exception information of the one or more first terminals 40 for the data analytics network element 10. The exception information may be used to assist the data analytics network element 10 in obtaining, through supervised learning, terminal information corresponding to an exception type.

The data analytics network element 10 is configured to determine exception information of the second terminal 50 based on the exception information and the first terminal information of the one or more first terminals 40 on the one or more network elements 30.

It should be understood that, in this embodiment of this application, the first terminal 40 and the second terminal 50 may access a core network (CN) via an access network. In this embodiment of this application, the first terminals 40 and the second terminals 50 may be distributed throughout a wireless network, and the first terminals 40 and the second terminals 50 may be stationary or moving.

In this embodiment of this application, the core network accessed by the first terminal 40 or the second terminal 50 may be a 5th generation core network (for example, a 5G core network (5G Core, 5GC)) or a 4th generation (4G) core network (for example, an evolved packet core (EPC)). Certainly, the core network may alternatively be a core network using a 3rd generation (3G) mobile communications technology or a core network using another future mobile communications technology. This is not limited in this embodiment of this application.

It may be understood that, if the core network accessed by the first terminal 40 or the second terminal 50 is a 5GC, the access network accessed by the first terminal 40 or the second terminal 50 is an access network in the 5G network. In this case, the access network element may be an access device in the 5G network or may be a radio access network (RAN) device, for example, a next generation NodeB (gNB). If the core network accessed by the first terminal 40 or the second terminal 50 is an EPC, the access network may be an access network in the 4G network. In this case, the access network element may be an evolved NodeB (eNB).

In an example, if the core network is an EPC, a network element or an entity corresponding to the user plane network element in the EPC may be a public data network gateway (PDN GW, PGW) or a serving network element (SGW). Network elements or entities corresponding to the session management network element and the mobility management network element in the EPC may be mobility management entities (MME). A network element or an entity corresponding to the policy control network element in the EPC may be a policy and charging rules function (PCRF) unit. In other words, in the 4G core network, the MME has both a session management function and a mobility management function. The data analytics network element may also be referred to as a network data analytics network element in the 4G core network.

Figure 2:
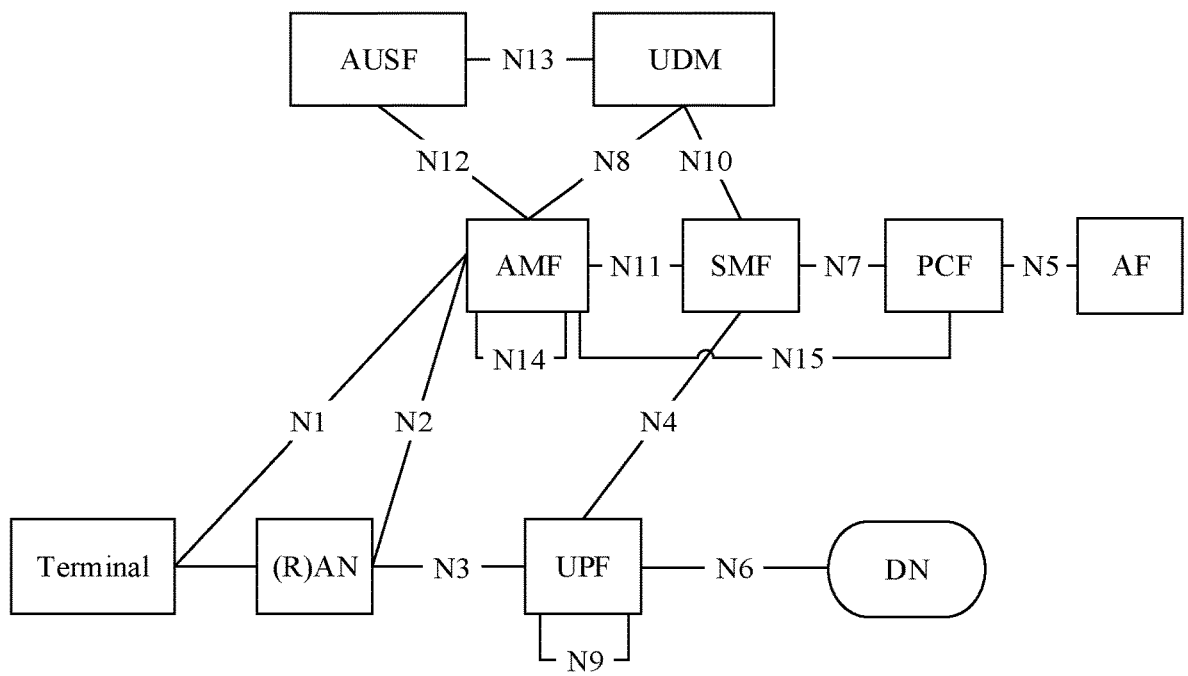
FIG. 2 is a system architecture diagram of a 5G system according to an embodiment of this application.

In another example, if the core network in the communications system is a 5GC, as shown in FIG. 2, a network element or an entity corresponding to the mobility management network element may be an access and mobility management function (AMF) network element, a network element or an entity corresponding to the session management network element may be a session management function (SMF) network element, a network element or an entity corresponding to the policy control network element may be a policy control function network element, a network element or an entity corresponding to the user plane network element may be a user plane function (UPF) network element, and a network element or an entity corresponding to the network management network element may be an operation, administration, and maintenance (OAM) network element (which may also be referred to as an operation, administration, and maintenance network element). In the 5G network, the data analytics network element in this embodiment of this application may be a network data analytics function (NWDAF) network element in the 5GC, a management data analytics function (MDAF) network element in a network management system, or even a data analytics network element on a RAN side.

Moreover, in addition to the SMF network element, the UPF network element, the RAN, the AMF network element, the PCF network element, and the AF network element, the architecture shown in FIG. 2 may further include an authentication server function (AUSF) network element, a network slice selection function (NSSF) network element, a network exposure function (NEF) network element, a user data repository (UDR), a unified data management (UDM) network element, a data network (DN) creation, and a network repository function (NRF) network element. The NSSF network element, the UDR, the NEF network element, and the NRF network element are not shown in the architectural diagram, and the NRF network element is mainly used for network element discovery.

The terminal communicates with the AMF network element through an N1 interface (N1 for short). The AMF entity communicates with the SMF network element through an N11 interface (N11 for short). The SMF network element communicates with one or more UPF network elements through an N4 interface (N4 for short). Any two of the one or more UPF network elements communicate with each other through an N9 interface (N9 for short). The UPF network element communicates, through an N6 interface (N6 for short), with the data network (DN) managed and controlled by the AF network element. The terminal accesses a network through an access network element (for example, the RAN device), and the access network element communicates with the AMF network element through an N2 interface (N2 for short). The SMF network element communicates with the PCF network element through an N7 interface (N7 for short), and the PCF network element communicates with the AF network element through an N5 interface. The access network element communicates with the UPF network element through an N3 interface (N3 for short). Any two AMF network elements communicate with each other through an N14 interface (N14 for short). The SMF network element communicates with the UDM through an N10 interface (N10 for short). The AMF network element communicates with the AUSF through an N12 interface (N12 for short). The AUSF network element communicates with the UDM network element through an N13 interface (N13 for short). The AMF network element communicates with the UDM network element through an N8 interface (N8 for short).

Figure 3:
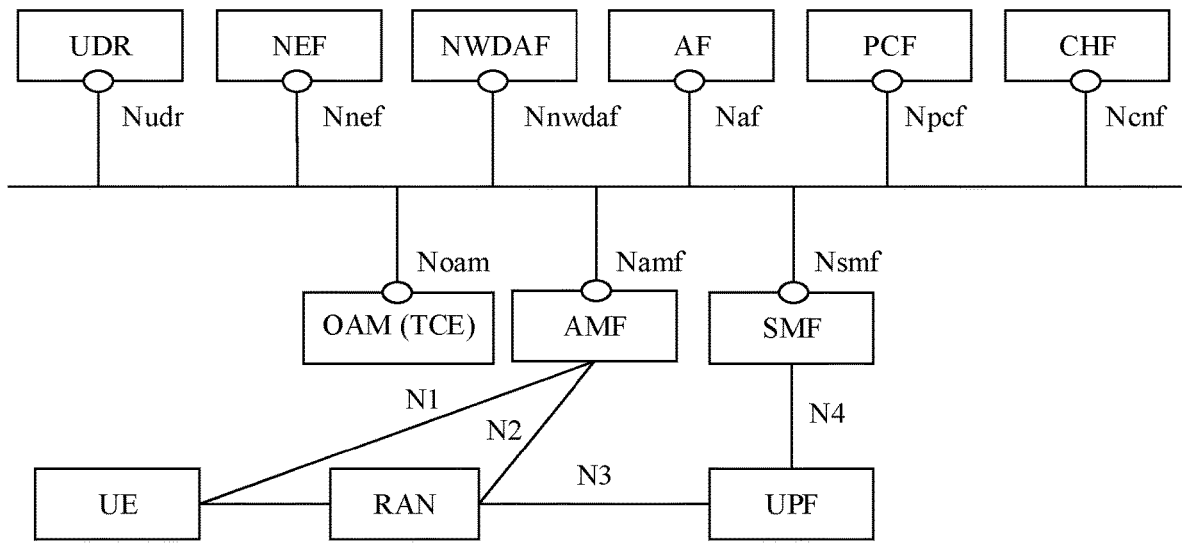
FIG. 3 is a system architecture diagram of another 5G system according to an embodiment of this application.

It should be understood that, in the network architecture shown in FIG. 2, control plane network elements may also exchange with each other through a service-oriented interface. For example, as shown in FIG. 3, an AMF network element, an SMF network element, a UDM network element, and a PCF network element interact with each other through a service-oriented interface. For example, an external service-oriented interface provided by the AMF network element may be Namf. An external service-oriented interface provided by the SMF network element may be Nsmf. An external service-oriented interface provided by the UDM network element may be Nudm. An external service-oriented interface provided by the PCF network element may be Npcf. It should be understood that for related descriptions of names of various service-oriented interfaces, refer to a diagram of a 5G system architecture in the standard 23501. Details are not described herein.

It should be noted that FIG. 2 and FIG. 3 merely show, for example, one UPF network element and one SMF network element. Certainly, a plurality of UPF network elements and SMF network elements may be included. For example, an SMF network element 1 and an SMF network element 2 are included. This is not specifically limited in this embodiment of this application.

It should be noted that the RAN, the AMF network element, the SMF network element, the UDM network element, the UPF network element, the PCF network element, and the like in FIG. 2 and FIG. 3 are merely names, and the names do not constitute any limitation on devices. In the 5G network and another future network, the access network element, the AMF network element, the SMF network element, the UDM network element, the UPF network element, and the PCF network element may have other names. This is not specifically limited in this embodiment of this application. For example, the UDM network element may alternatively be replaced by a home subscriber server (HSS), a user subscription database (USD), a database entity, or the like. A general description is provided herein, and details are not described below again.

The AMF network element is mainly responsible for mobility management in a mobile network, such as user location update, registration of a user with a network, and user switching.

The SMF network element is mainly responsible for session management in the mobile network, such as session establishment, modification, and release. For example, specific functions are assigning an IP address to a user and selecting a UPF that provides a packet forwarding function.

The PCF network element is responsible for providing a policy, such as a quality of service QoS policy and a slice selection policy, for the AMF network element and the SMF network element.

The UDM network element is configured to store user data such as subscription information and authentication/authorization information.

The UPF network element is mainly responsible for processing a user packet, such as forwarding and charging for the user packet.

The DN refers to a carrier network that provides a data transmission service for a user, such as an IP multimedia service (IMS) or the Internet.

The terminal accesses the data network (DN) by establishing a session (PDU session) that passes through the terminal, the RAN, the UPF network element, and the DN.

The terminal is a device that provides a user with voice and/or data connectivity, for example, a handheld device or a vehicle-mounted device with a wireless connection function. The terminal may also be referred to as user equipment (UE), an access terminal, a user unit, a user station, a mobile station, a mobile console (Mobile), a remote station, a remote terminal, mobile equipment, a user terminal, wireless telecom equipment, a user agent, user equipment, or a user apparatus. The terminal may be a station (STA) in a wireless local area network (WLAN); or may be a cellular phone, a cordless phone, a session initiation protocol (SIP) phone, a wireless local loop (WLL) station, a personal digital assistant (PDA) device, a handheld device having a wireless communication function, a computing device or another processing device connected to a wireless modem, a vehicle-mounted device, a wearable device, a terminal in a next generation communications system (for example, a 5th generation (5G) communications network), a terminal in a future evolved public land mobile network (PLMN), or the like. 5G may also be referred to as new radio (NR).

For example, in the embodiments of this application, the terminal may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is more than a hardware device, and implements powerful functions through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

Currently, the data analytics network element can assist an operator in monitoring an IoT terminal based on data analysis. The core steps are as follows:

(1) Data Collection Phase

The data analytics network element collects, from a network element, terminal behavior data of at least one terminal on the network element (referring to Table 1), then obtains terminal information of each of the at least one terminal through data association, and uses the terminal information as a training data set. For example, the network element may be any one or more of an AMF network element, an SMF network element, and a UPF network element.

TABLE 1

Terminal behavior data collected by the data analytics network element from different network elements

| Terminal behavior data | Data Source | Function |
|---|---|---|
| UE ID (terminal identifier) | AMF network element/UPF network element/SMF network element | Terminal identifier, for example, an SUPI or an IP address, used to associate terminal behavior data on different NEs |
| UL or DL packet latency (uplink or downlink packet delay) | UPF network element/SMF network element | Indicating an uplink delay or a downlink delay of a data flow |
| UL or DL data rate (uplink or downlink data rate) | UPF network element/SMF network element | Indicating an uplink data rate or a downlink data rate of a data flow of a terminal |
| Frequent mobility re-registration (Quantity of frequent mobility re-registrations) | AMF network element | Quantity of re-registrations initiated by the terminal in a same area |
| UE locations (1 . . . max) (terminal location) | AMF network element | Location information of the terminal |
| >UE location (terminal location) | | Tracking area (TA) or cell |
| Timestamp | | Timestamp |

(2) Training Phase

The data analytics network element clusters the at least one terminal based on the terminal information of each of the at least one terminal by using an unsupervised learning (K-Means) algorithm. Terminals in a same category have same terminal behavior characteristics. The terminal behavior characteristics may also be referred to as expected terminal behavior information that is from a network side. The data analytics network element obtains the following information during the training phase:

>UE group 1, UE ID list 1, Expected UE behavior parameters 1;
>UE group 2, UE ID list 2, Expected UE behavior parameters 2;
. . .
>UE group N, UE ID list N, Expected UE behavior parameters N.

Note: N indicates a quantity of categories obtained after the clustering. A UE ID in a category is different from a UE ID in another category. The UE ID is usually an SUPI or an IMSI. Quantities of terminals in the categories may be different or the same. In the categories, the expected terminal behavior information that is from the network side includes a same parameter type, but may include different parameter values. The expected terminal behavior information that is from the network side is shown in Table 2:

TABLE 2

Expected terminal behavior information that is from the network side

| Data | Type | Function |
|---|---|---|
| UE group ID or UE ID (terminal group identifier or terminal identifier) | | Terminal identifier or terminal group identifier |
| Stationary indication | UE mobility (terminal mobility) | Indicating whether a terminal is stationary |
| UE moving trajectory (terminal moving trajectory) | | Terminal moving trajectory |
| UE location (1 . . . max) (terminal location) | UE mobility (terminal mobility) | |
| >UE location (terminal location) | UE Mobility | TA or cells |
| >Timeslot (timeslot) | UE Mobility | Timeslot in which the terminal moves to the location |
| >Average duration | UE Mobility | Duration in which the terminal stays at the location |
| >Frequency | UE Mobility | Frequency at which the terminal moves to the location in a specified time period |
| Periodic communication indicator | UE communication (terminal communication) | Indicating whether the terminal supports periodic communication |
| Communication duration time (periodic communication duration) | | Indicating communication duration |
| Periodic time (communication period) | | Indicating a communication period |
| Scheduled communication time | | Time zone or a day in a week |
| Maximum latency (maximum delay) | | Maximum downlink data delay |
| Maximum response time | | Maximum downlink response time (duration in which the terminal is reachable) |
| Suggested number of downlink packets (suggested quantity of downlink packets) | | Maximum quantity of downlink packets that can be buffered on a UPF |
| Traffic characterization | | Estimated uplink or downlink traffic volume |
| Traffic volume | | Uplink or downlink traffic volume |
| Confidence | | Confidence of data in UE communication |

(3) Real-Time Detection Phase (that is, Model Application Phase)

The data analytics network element collects terminal behavior data of another terminal in real time from the AMF network element, the SMF network element, and the UPF network element, and associates the data with real-time terminal information. The data analytics network element compares the real-time terminal information with the expected terminal behavior information that is from the network side. If the real-time terminal information does not match the expected terminal behavior information that is from the network side, the data analytics network element determines that the another terminal is abnormal. In addition, the data analytics network element may further determine an exception type of the another terminal, and feed back the exception type to the PCF network element or the AF network element to perform processing on the abnormal terminal.

TABLE 3

Exception type and policy

| Exception Type | Access management (AM)/Session management (SM) policy and network element behavior |
| --- | --- |
| Unexpected terminal location (Unexpected UE location) | Adding a current location of a terminal to a mobility restriction area |
| Unexpected long-live/large rate flow | Reducing a maximum bit rate MBR) of a corresponding quality of service (QoS) flow |
| Unexpected wakeup | Setting a mobility management back-off timer (MM back-off timer) for the terminal, and forbidding access of the terminal before the timer expires |
| Suspicion of DDoS attack | Releasing the PDU session, setting an SM back-off timer for the terminal, and before the timer expires, forbidding the terminal from establishing a session |
| Wrong destination address | Updating a packet filter of a corresponding QoS flow and rejecting a wrong service data flow (SDF) |
| Ping-ponging stationary UE | Updating a registration area (Registration area) of the terminal |
| Missed terminal (Missed UE) | Deleting registration information of the terminal from the AMF, the SMF, and the UDM |
| Extreme frequent service access/abnormal traffic volume (Too frequent Service Access/Abnormal traffic volume) | Updating a packet filter of a corresponding QoS flow, and rejecting a wrong SDF or reducing an MBR of the corresponding QoS flow |

In conclusion, the data analytics network element mainly uses the unsupervised learning algorithm to cluster the terminal behavior data of the terminals and learn terminal behavior characteristics. During real-time detection, if the data analytics network element finds that real-time terminal information of a terminal does not match the terminal behavior characteristics, the data analytics network element determines that the terminal is abnormal. In the data collection phase, terminal behavior data collected by the data analytics network element includes both terminal behavior data of normal terminals and terminal behavior data of abnormal terminals. If the terminal behavior data of the normal terminals and that of the abnormal terminals are mixed for data analysis in the training phase, the terminal behavior characteristics obtained by the data analytics network element in the training phase are inaccurate. In this way, even if the data analytics network element determines that the real-time terminal information does not match the terminal behavior characteristic and determines that the terminal is abnormal, how the data analytics network element further obtains an exception type (as listed in Table 3) is unknown, and is implemented in the data analytics network element.

Based on this, the embodiments of this application provide a terminal information processing method. In the method, a data analytics network element obtains exception information of a first terminal on an application function network element, where the exception information may be used to reflect that the first terminal is in an abnormal state. Therefore, the data analytics network element may obtain a training data set based on the exception information, and first terminal information of the first terminal on one or more network elements. For example, the training data set may include some first terminal information associated with the exception information in the first terminal information and some first terminal information not associated with the exception information in the first terminal information. Therefore, after obtaining the training data set, the data analytics network element quickly and accurately determines the exception information of the second terminal based on the training data set.

It may be understood that, in the embodiments of this application, a step performed by a data analytics network element in a terminal information processing method may also be performed by a chip applied to the data analytics network element, a step performed by a network element in a terminal information processing method may also be performed by a chip applied to the network element, and a step performed by an application function network element in a terminal information processing method may also be performed by an apparatus, for example, a chip, applied to the application function network element. In the following embodiments, that the terminal information processing methods are respectively performed by a data analytics network element, a network element, and an application function network element are used as examples for description.

Figure 4:
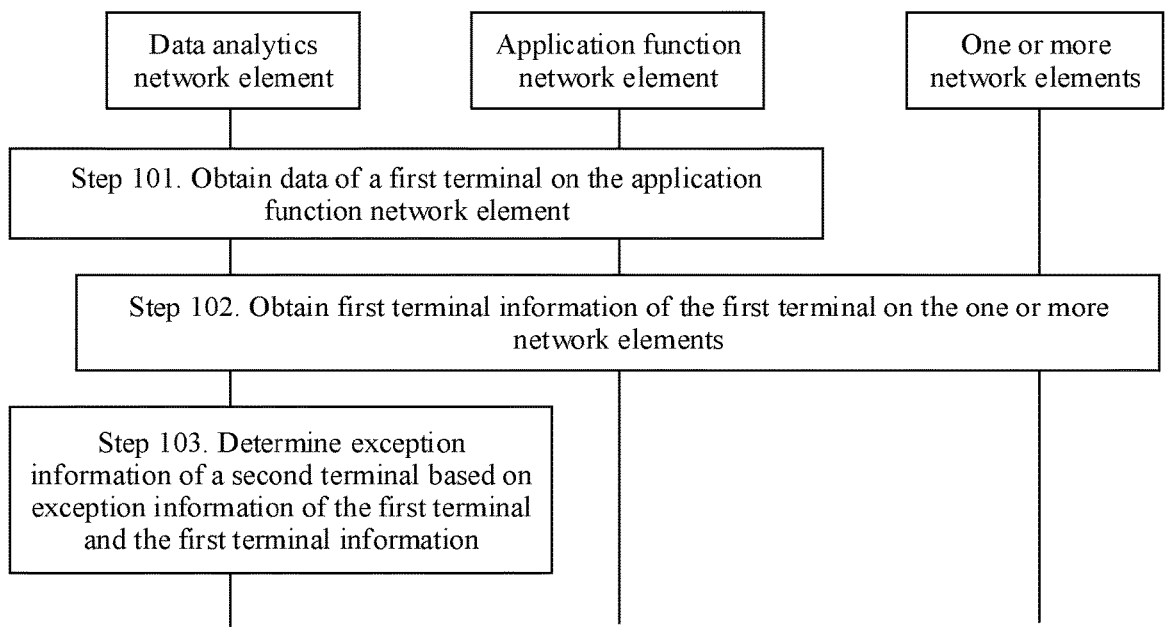
FIG. 4 is a schematic flowchart of a terminal information processing method according to an embodiment of this application.

FIG. 4 is a schematic flowchart of a terminal information processing method according to an embodiment of this application. The method includes the following steps.

Step 101. A data analytics network element obtains data of a first terminal on an application function network element, where the data includes exception information of the first terminal.

For example, in this embodiment of this application, the data analytics network element may obtain the data of the first terminal on the application function network element from the application function network element. Certainly, the data analytics network element may alternatively obtain the exception information of the first terminal from another network element. The another network element has at least the exception information of the first terminal. For example, the exception information of the first terminal on the another network element may be sent by the application function network element to the another network element. For example, the another network element may be a network management network element or a subscriber data management network element, and the another network element is not limited in the embodiments of this application. The subscriber data management network element may be a UDM network element or a UDR network element.

For example, in this embodiment of this application, the application function network element may be a firewall or a threat information sharing center.

In a possible example, in this embodiment of this application, the exception information includes any one or more of the following information: an exception type, an exception identifier, an exception level, and additional information. The exception identifier is used to identify the exception type, the exception level is used to reflect an exception degree of the exception type, and the additional information is used to indicate description information of the exception type.

For example, the exception type may be one or more of the following types: a distributed denial of service (DDOS) attack (Suspicion of DDOS attack), an unexpected long-live flow (Unexpected long-live/large rate flows) that is from a network side, an unexpected large rate flow (Unexpected long-live/large rate flows) that is from the network side, a wrong destination addresses, an APT attack, an abrupt traffic change, a traffic surge, and data theft.

For example, the exception degree may be slight, medium, or severe. If a quantity of terminals of a same exception type accounts for 10% of a total quantity of terminals in an area to be analyzed, it can be determined that the exception type is a slight exception. If a quantity of terminals of a same exception type accounts for 20% to 30% of the total quantity of terminals in the area to be analyzed, it can be determined that the exception type is a medium exception. If a quantity of terminals of a same exception type accounts for more than 30% of the total quantity of terminals in the area to be analyzed, it can be determined that the exception type is a severe exception. A exception degree depends on an implementation. For example, if there are 100,000 terminals on a network and fewer than 10,000 terminals are attacked, the exception degree is light. If 10,000 to 30,000 terminals are attacked, the exception degree is medium. If more than 30,000 terminals are attacked, the exception degree is severe.

In a possible implementation, in this embodiment of this application, the data of the first terminal on the application function network element further includes any one or more of the following information corresponding to the first terminal: a service identifier of a service corresponding to the flow; a terminal type, and a first identifier.

For example, the first identifier includes at least one of the following information: an internet protocol (IP) 5-tuple, an identifier of the first terminal, an identifier of a user plane network element, the service identifier, an identifier of a service server, and an identifier of the application function network element.

In another possible example, in this embodiment of this application, the exception information may further include a terminal type. The terminal type is used to identify a brand, a model, or an operating system of a terminal. For example, a type allocation code is in an IMEI or a PEI. Generally, terminals with a same TAC have same hardware and version characteristics. Therefore, the terminals may have same vulnerability and may be controlled by attackers using the same vulnerability. Therefore, if the data analytics network element obtains the exception type and the corresponding terminal type through analysis, the network side may be assisted in processing an exception based on the terminal type. For example, the terminal type may be a terminal using an iOS system, a terminal using an Android system, or a terminal using a Windows system. For example, if the terminal type is a terminal using a Windows system, and the data analytics network element determines an exception type of the terminal using the Windows system, the data analytics network element may determine that a terminal using the same operating system is most possibly abnormal.

It should be noted that the data analytics network element may obtain the data of the first terminal on the application function network element at a granularity of a terminal. Certainly, the data analytics network element may alternatively obtain the data of the first terminal on the application function network element at a flow granularity. In a case of the flow granularity, the exception information of the first terminal may be exception information of a flow of the first terminal. In the case of the flow granularity, the data may further include an identifier of a flow: The identifier of the flow is used to identify the flow: The flow may represent any one or more of all flows of the first terminal. The flow may be a flow used when a terminal uses a service.

Step 102. The data analytics network element obtains first terminal information of the first terminal on one or more network elements.

It should be understood that the one or more network elements serve the first terminal.

The first terminal information of the first terminal on the one or more network elements may be first terminal information of the first terminal on each of the one or more network elements.

In this embodiment of this application, first terminal information of the first terminal on any network element may include identification information and first terminal behavior data that is of the first terminal on the network element. For example, first terminal information of a terminal 1 on a network element 1 may include identification information and first terminal behavior data that is of the terminal 1 on the network element 1: first terminal information of the terminal 1 on a network element 2 may include identification information and first terminal behavior data that is of the terminal 1 on the network element 2.

In this embodiment of this application, when any network element provides the data analytics network element with first terminal behavior data of the first terminal on the network element, the network element may further provide identification information for the data analytics network element. In this way, the data analytics network element can associate first terminal information of the first terminal on different network elements based on identification information. For example, the identification information may be any one or more of the identifier of the first terminal, an IP address, and time information.

It should be noted that first terminal behavior data of a same first terminal on different network elements may be the same or may be different. This is not limited in this embodiment of this application.

For example, in this embodiment of this application, a terminal identifier may be one or more of the following: an internet protocol (IP) address, a subscription permanent identifier (SUPI), a permanent equipment identifier (PEI), a generic public subscription identifier (GPSI), an international mobile subscriber identifier (IMSI), an international mobile equipment identity (IMEI), an IP 5-tuple, and a mobile station international integrated service digital network number (MSISDN). For a terminal identifier in the following embodiments, refer to the description herein. Details are not described below again.

For example, for specific content of terminal behavior data of a terminal on different network elements in this embodiment of this application, refer to the description in Table 1 or Table 4. Details are not described herein again.

TABLE 4

| Terminal behavior data | | |
|---|---|---|
| Data type | Network element name | Function |
| Terminal identifier | AMF network element/SMF network element/RAN | Identifying a terminal |
| Location information | | |
| >Time (Timestamp) | AMF network element/RAN | Time at which the terminal is in the location |
| >Location | | Location of the terminal at a corresponding time |
| Communication pattern information | | |
| >Communication start time | SMF network element/UPF network element | Time at which communication between the terminal and the SMF network element starts |

TABLE 4-continued

Terminal behavior data

| Data type | Network element name | Function |
|---|---|---|
| >Communication end time | | Time at which communication between the terminal and the SMF network element ends |
| >Registration time | AMF network element | Time at which the terminal registers with the AMF network element |
| >Deregistration time | | Time at which the terminal deregisters from the AMF network element |
| >Session establishment time (PDU Session Establishment Time) | SMF network element | Time at which the terminal establishes a PDU session |
| >Session modification time (PDU Session Modification Time) | | Time at which the PDU session of the terminal is modified |
| >Session release time (PDU Session Release Time) | | Time at which the PDU session of the terminal is released |
| Network configuration information | | |
| >(Uplink or downlink) packet delay (UL or DL Packet Delay) | SMF network element/UPF network element/RAN | Indicating an end-to-end (between the terminal and a service server or a DN) delay of an uplink or downlink packet |
| >(Uplink or downlink) packet size (UL or DL Packet Size) | | Indicating a size of a buffered uplink packet or a buffered downlink packet |
| >(Uplink or downlink) packet quantity (UL or DL Packet Number) | | Indicating a quantity of buffered uplink packets or buffered downlink packets |
| >(Uplink or downlink) packet transfer start time | | Indicating a time at which transmission of an uplink packet or a downlink packet starts |
| >(Uplink or downlink) packet transfer end time | | Indicating a time at which transmission of an uplink packet or a downlink packet ends |
| >RRC connection establishment time | AMF network element/RAN | Indicating a time at which a radio resource control (RRC) connection of the terminal is established |
| >RRC connection release time (RRC Release Time) | | Indicating a time at which the RRC connection of the terminal is released |
| At least one piece of first-type data on the AMF network element (normalized UE behavior data from AMF) | AMF network element | Other terminal behavior data on the AMF network element |
| At least one piece of first-type data on the SMF network element (normalized UE behavioral data from SMF) | SMF network element | Other terminal behavior data on the SMF network element |
| At least one piece of first-type data on the UPF network element (normalized UE behavioral data from UPF) | UPF network element | Other terminal behavior data on the UPF network element |
| At least one piece of first-type data on the RAN (normalized UE behavioral data from RAN) | RAN | Other terminal behavior data on the RAN |
| UL or DL data rate | UPF network element/SMF network element | Indicating an uplink data rate or a downlink data rate of a data flow of the terminal |

It should be noted that the first terminal information provided by any network element includes any one or more of first terminal behavior data of a normal type and first terminal behavior data of an exception type.

It should be noted that, if the data analytics network element obtains first terminal information that corresponds to a same first terminal and that is on a plurality of network elements, the data analytics network element may further associate the first terminal information that corresponds to the first terminal and that is on the plurality of network elements, to obtain a complete information set of the first terminal. The complete information set of the first terminal includes at least first terminal behavior data of the first terminal on each of the plurality of network elements. For a data association process, refer to the following description:

For example, the plurality of network elements include a user plane network element, a session management network element, a mobility management network element, and an access network element. The data association process is as follows: First terminal behavior data of the first terminal on the user plane network element is associated with first terminal behavior data of the first terminal on the session management network element by using an IP address and time information. The data analytics network element associates the first terminal behavior data of the first terminal on the session management network element with first terminal behavior data of the first terminal on the mobility management network element by using an identifier of the first terminal. The data analytics network element associates the first terminal behavior data of the first terminal on the user plane network element with first terminal behavior data of the terminal on the access network element by using AN Tunnel Info and the time information. In this way, the complete information set of the first terminal is finally obtained. The complete information set of the first terminal includes the first terminal behavior data of the first terminal on the user plane network element, the first terminal behavior data of the first terminal on the session management network element, the first terminal behavior data of the first terminal on the mobility management network element, and the first terminal behavior data of the first terminal on the access network element.

Certainly, the data analytics network element may alternatively obtain the complete information set of the first terminal through another data association process, or the complete information set of the first terminal is sent by a network element other than the data analytics network element to the data analytics network element. A network element other than the data analytics network element performs an association process, obtains a complete information set of the first terminal, and then sends the complete information set of the first terminal to the data analytics network element. Details are not described again in the embodiments of this application.

Step 103. The data analytics network element determines exception information of a second terminal based on the exception information of the first terminal and the first terminal information.

It should be understood that, in step 103, the data analytics network element determines the exception information of the second terminal based on the exception information of the first terminal and the first terminal information of the first terminal on each network element.

For example, in this embodiment of this application, the exception information of the second terminal includes an exception type, and an identifier (UE group ID) of the second terminal, a terminal identifier list, or a terminal group identifier (UE group ID). The terminal identifier list or the terminal group identifier is a group or a list to which the second terminal belongs.

In the terminal information processing method provided in this embodiment of this application, the data analytics network element obtains the exception information of the first terminal on the application function network element, where the exception information may be used to reflect that the first terminal is in an abnormal state. Therefore, the data analytics network element may obtain a training data set based on the exception information, and first terminal information of the first terminal on one or more network elements. For example, the training data set may include some first terminal information associated with the exception information in the first terminal information and some first terminal information not associated with the exception information in the first terminal information. Therefore, after obtaining the training data set, the data analytics network element quickly and accurately determines the exception information of the second terminal based on the training data set.

Figure 5A:
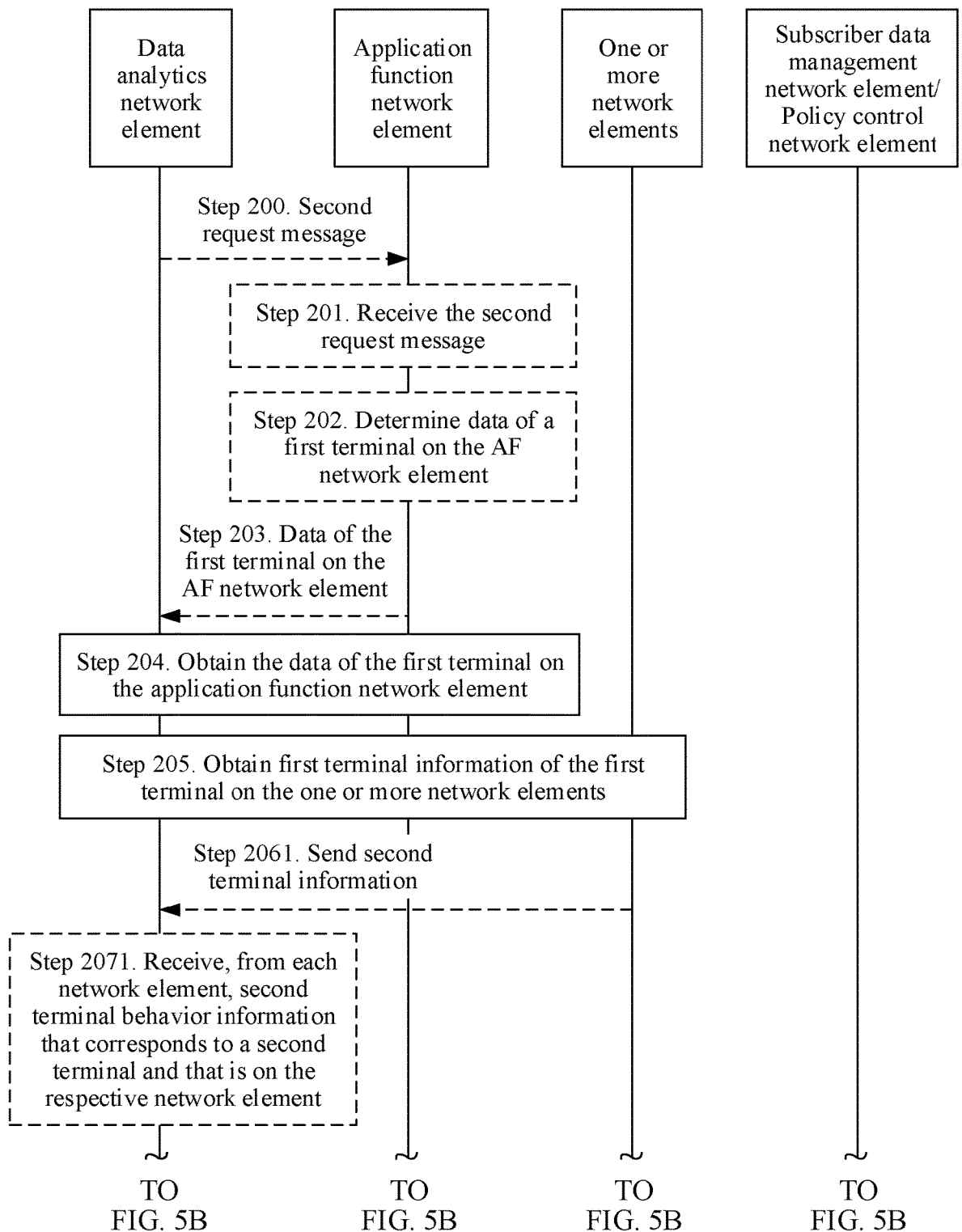
FIG. 5A and FIG. 5B are a schematic flowchart of another terminal information processing method according to an embodiment of this application.
Figure 5B:
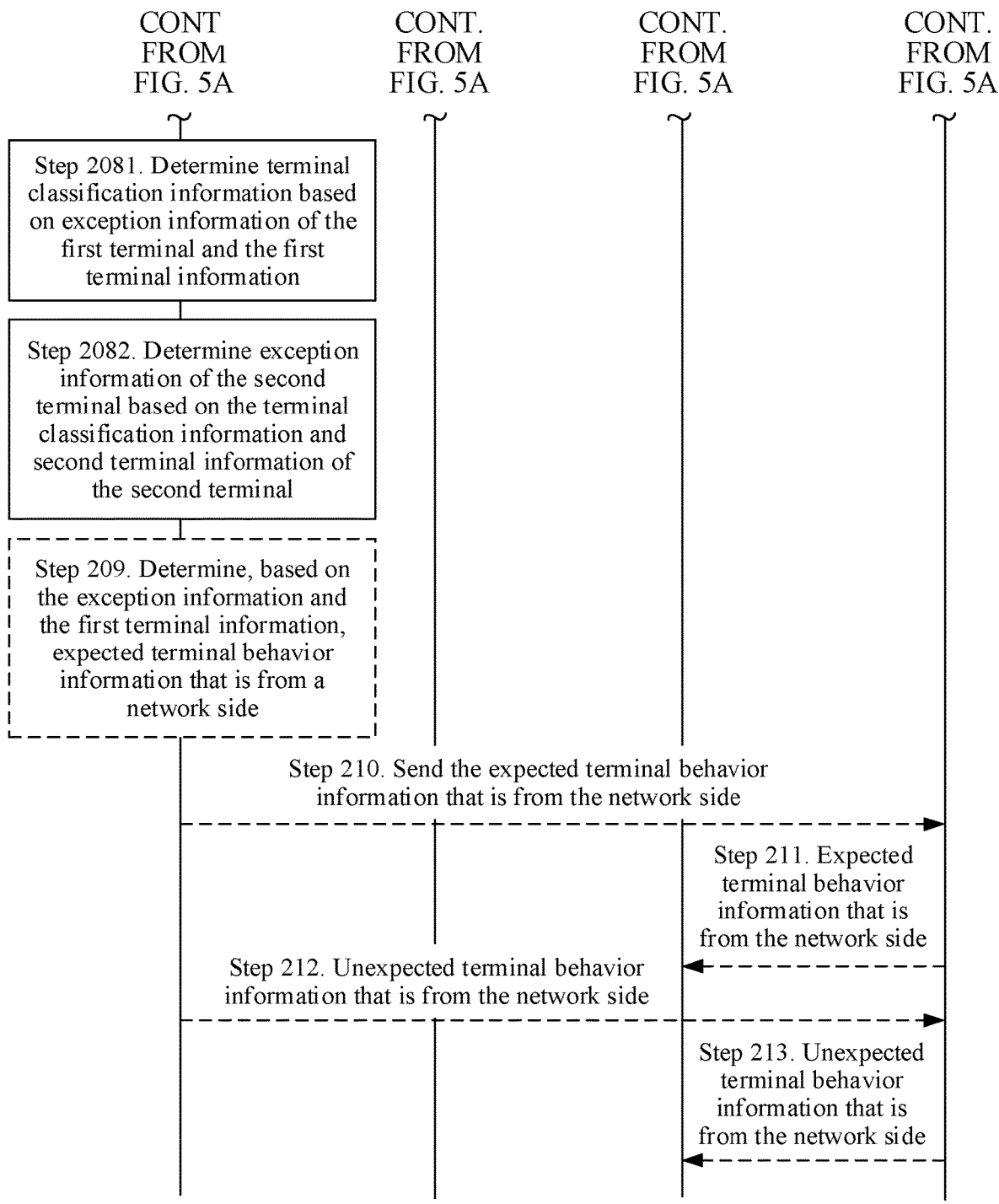

In another possible embodiment of this application, as shown in FIG. 5A and FIG. 5B, this embodiment may include step 204, step 205, and step 208. For step 204, step 205, and step 208, correspondingly refer to descriptions in step 101 to step 103. Details are not described herein again.

In a possible implementation, with reference to FIG. 5B, step 208 in this embodiment of this application may be implemented in the following manner:

Step 2081. The data analytics network element determines terminal classification information based on the exception information of the first terminal and the first terminal information.

The terminal classification information is obtained by training the exception information, and the first terminal information of the first terminal on the one or more network elements by using a supervised machine learning algorithm, and the terminal classification information is used to determine normal information in second terminal information and the exception information of the second terminal.

For example, in this embodiment of this application, step 2081 may be implemented in the following manner 1 and manner 2:

Manner 1: The data analytics network element may process the first terminal information of the first terminal on the one or more network elements based on the exception information of the first terminal, to obtain first terminal information of a normal type and first terminal information of an exception type that are in the first terminal information.

The data analytics network element may classify the first terminal information of the first terminal on the one or more network elements depending on whether the first terminal information of the first terminal on the one or more network elements is associated with the exception information, to obtain <normal type, first terminal information> and <exception type, first terminal information>.

For example, the data analytics network element determines that first terminal information that is in the first terminal information of the first terminal on the one or more network elements and that is associated with the exception type belongs to the exception type. The data analytics network element determines that first terminal information that is in the first terminal information of the first terminal on the one or more network elements and that is not associated with the exception type belongs to the normal type.

In addition, each exception type may correspond to one second identifier, and second identifiers corresponding to different exception types may be different. In this embodiment of this application, if one piece of first terminal information and one exception type correspond to a same second identifier, the data analytics network element may determine that the first terminal information belongs to the exception type.

For example, the second identifier may be an IP 5-tuple. For example, the exception information provided by the application function network element is <IP 5-tuple, exception type>, and first terminal information obtained by the data analytics network element from a user plane network element also includes the IP 5-tuple. Therefore, the data analytics network element may use the IP 5-tuple to associate the exception type with the first terminal information from the user plane network element. If the association succeeds, first terminal information corresponding to the IP 5-tuple is abnormal, and remaining first terminal information that is not associated with <IP 5-tuple, exception type> that is from the application function network element is of the normal type. The IP 5-tuple may be used to identify a service flow of a terminal. The IP 5-tuple includes an IP address of the terminal, a port of the terminal, an IP address of the service server, a port number of the service server, and a transport layer protocol of the service.

For details, refer to classification in Table 5.

TABLE 5

| Sequence number | Type | Data |
| --- | --- | --- |
| 1 | Normal type | First terminal information 1 |
| 2 | Exception type X | First terminal information 2 |
| 3 | Exception type Y | First terminal information 3 |
| 4 | Exception type Z | First terminal information 4 |
| 5 | Normal type | First terminal information 5 |
| 6 | Exception type Y | First terminal information 6 |
| 7 | Normal type | First terminal information 7 |
| ... | ... | ... |

For example, with reference to Table 5, if the first terminal information 6 and the exception type Y have a common second identifier, the first terminal information 6 belongs to the exception type Y. If the first terminal information 4 and the exception type Z have a common second identifier, the first terminal information 4 belongs to the exception type Z.

Manner 2: The data analytics network element performs training based on data samples <exception type, first terminal information> and <normal type, first terminal information> by using a supervised machine learning algorithm, to obtain the terminal classification information.

For example, the supervised machine learning algorithm may be logistic regression or a support vector machine.

In this embodiment of this application, a process in which training is performed after the first terminal information of the first terminal on the one or more network elements is classified by using the exception information may be referred to as the supervised machine learning algorithm (for example, a logistic regression algorithm), and a process in which training is directly performed without classifying the first terminal information of the first terminal on the one or more network elements is unsupervised learning (for example, K-Means).

The logistic regression is used as an example. An expression corresponding to the terminal classification information (for example, a normal type and an exception type in a case of binary classification) may be represented as $$y_i = \begin{cases} 0, z_i < 0 \\ 1, z_i \geq 0 \end{cases},$$

where $z_i = w_0 * x_{i0} + w_1 * x_{i1} + w_2 * x_{i2} + w_3 * x_{i3} + \ldots w_D * x_{iD}$, and $y_i$ indicates a classification result of second terminal information of an $i^{th}$ second terminal. $y_i = 1$ represents that the second terminal is in an abnormal state, $y_i = 0$ represents that the second terminal is in a normal state, and $z_i$ represents an intermediate data value obtained by performing linear regression on $x_i$. $x_i = \{x_{i0}, x_{i1}, x_{i2}, x_{i3}, \ldots, x_{iD}\}$ represents a first vector corresponding to the second terminal information of the $i^{th}$ second terminal, $w = \{w_0, w_1, w_2, w_3, \ldots, w_D\}$ represents a weight, and i is an integer greater than or equal to 1.

Step 2082. The data analytics network element determines the exception information of the second terminal based on the terminal classification information and second terminal information of the second terminal.

It should be understood that the data analytics network element may further determine normal information in the second terminal information based on the exception information of the first terminal and the second terminal information.

It should be understood that the second terminal information of the second terminal may include second terminal information of the second terminal on one or more network elements.

In an example, when a value, in the expression corresponding to the terminal classification information, of a first vector corresponding to second terminal information is a first value, the data analytics network element determines that the second terminal information belongs to the exception type.

In another example, when a value, in the expression corresponding to the terminal classification information, of a first vector corresponding to second terminal information is a second value, the data analytics network element determines that the second terminal information belongs to the normal type.

For example, the first value may be 1, and the second value may be 0.

For example, in a real-time detection phase, the data analytics network element inputs a first vector corresponding to real-time second terminal information into the expression corresponding to the terminal classification information. If a value output by the expression corresponding to the terminal classification information is 0, the data analytics network element determines that the second terminal belongs to the normal type. If a value output by the expression corresponding to the terminal classification information is 1, the data analytics network element determines that the second terminal belongs to the exception type.

It should be noted that the binary classification is used as an example in the foregoing algorithm example. If multi-classification is used, a classifier that can support the multi-classification is required. For example, for the training data set in Table 5, a classifier that can support four classifications (a normal type, an exception type X, an exception type Y, and an exception type Z) is required. For details, refer to implementation in the prior art, and details are not described herein.

In another possible implementation, with reference to FIG. 6B, step 208 in this embodiment of this application may be implemented in the following manner:

Step 2083. The data analytics network element determines, based on the exception information of the first terminal and the first terminal information, unexpected terminal behavior information that is from a network side and that corresponds to the exception information.

A terminal behavior information type of the unexpected terminal behavior information that is from the network side is the same as that in Table 2, but a data value of each piece of behavior information may be different from that of the expected terminal behavior information that is from the network side.

For example, a process in which the data analytics network element determines, based on the exception information, the unexpected terminal behavior information that is from the network side may be that an expert observes the exception information and the first terminal information to determine the unexpected terminal behavior information that is from the network side, or may be that a relationship between the exception information and the first terminal information is fitted through linear regression, and a data value corresponding to a tangent vector corresponding to a fitting result may be used as the unexpected terminal behavior information that is from the network side.

In this embodiment of this application, the unexpected terminal behavior information that is from the network side may also be referred to as terminal behavior information that is not expected by the network side.

In an implementation, step 2083 in this embodiment of this application may be implemented in the following manner: A knowledge base of an exception type is obtained through learning based on a training data set <exception type, first terminal information>. Specific content is shown in Table 6.

TABLE 6

Knowledge base of an exception type and unexpected terminal behavior information that is from a network side

| Sequence number | Type | Unexpected UE behavior parameters |
|---|---|---|
| 1 | Exception type X | Unexpected terminal behavior information 1 that is from the network side |
| 2 | Exception type Y | Unexpected terminal behavior information 2 that is from the network side |
| 3 | Exception type Z | Unexpected terminal behavior information 3 that is from the network side |

In an actual operation process, the knowledge base may be created by discovering a rule by using the training data set <exception type, first terminal information>. Alternatively, a curve of first terminal information for any exception type is fitted through linear regression, and a vector corresponding to a tangent direction of the curve is used as unexpected terminal behavior information that is from the network side and that corresponds to the exception type.

Step 2084. The data analytics network element determines the exception information of the second terminal based on the unexpected terminal behavior information that is from the network side and that corresponds to the exception information and second terminal information of the second terminal.

In a real-time monitoring phase, the data analytics network element may separately compare real-time second terminal information with unexpected terminal behavior information that is from the network side and that corresponds to each exception type (for example, the exception type X, the exception type Y, or the exception type Z) in <exception type, unexpected terminal behavior information that is from a network side>. If a similarity between the real-time second terminal information and unexpected terminal behavior information that is from the network side and that corresponds to an exception type is very high, the data analytics network element may determine that the second terminal information is in an abnormal state, and determine an exception type corresponding to the unexpected terminal behavior information that is from the network side and that is very similar to the second terminal information as an exception type of the second terminal information.

It should be noted that, if one second terminal has a plurality of pieces of second terminal information, and different second terminal information in the plurality of pieces of second terminal information belongs to different exception types, the second terminal may belong to a plurality of different exception types at the same time. In other words, the plurality of different exception types of the second terminal include an exception type of each of the plurality of pieces of second terminal information. For example, if a second terminal has different behavior information at different time points, the second terminal may have different exception information at the different time points.

For example, if a terminal 2 has second terminal information 1 and second terminal information 2, the second terminal information 1 belongs to the exception type X, and the second terminal information 2 belongs to the exception type Y, exception types of the terminal 2 include the exception type Y and the exception type X.

It should be understood that, when the unexpected terminal behavior information that is from the network side is trained based on the exception type, if there are a plurality of types of unexpected terminal behavior information that is from the network side, each of the plurality of types of unexpected terminal behavior information that are from the network side corresponds to one exception type.

In an implementation, step 2084 in this embodiment of this application may be implemented in the following manner: The data analytics network element determines the exception information of the second terminal when a similarity between the second terminal information and the unexpected terminal behavior information that is from the network side is greater than or equal to a first threshold.

It should be understood that, if the similarity between the second terminal information and the unexpected terminal behavior information that is from the network side is greater than or equal to the first threshold, an exception type of the second terminal information is an exception type corresponding to the unexpected terminal behavior information that is from the network side and whose similarity with the second terminal information is greater than or equal to the first threshold.

For example, as shown in Table 6, if a similarity between second terminal information and the unexpected terminal behavior information 3 that is from the network side is greater than or equal to the first threshold, the second terminal information belongs to the exception type Z.

In an example, when an error between 1 and a cosine value between a first vector $Vector_i$ corresponding to the second terminal information and a second vector $Vector_j$ corresponding to the unexpected terminal behavior information that is from the network side is less than a first preset error, the similarity is greater than or equal to the first threshold. j indicates a $j^{th}$ piece of unexpected terminal behavior information that is from the network side.

For example, the first preset error may fall within [0.0001, 0.0003].

In another example, when an error between 0 and an included angle between a first vector corresponding to the second terminal information and a second vector corresponding to the unexpected terminal behavior information that is from the network side is less than a second preset error, the similarity is greater than or equal to the first threshold.

Specific values of the first preset error and the second preset error are not limited in the embodiments of this application.

Figure 6A:
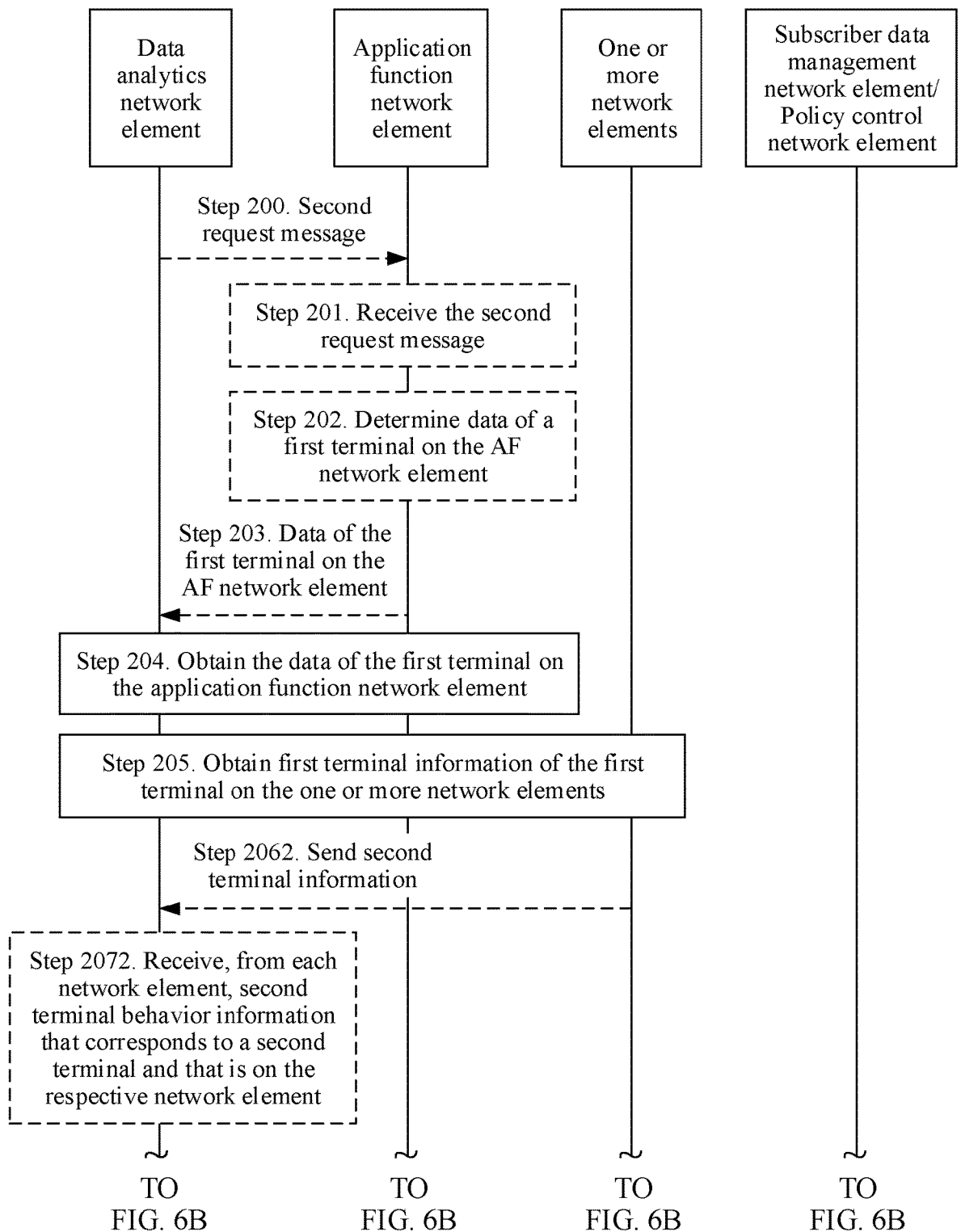
FIG. 6A and FIG. 6B are a schematic flowchart of still another terminal information processing method according to an embodiment of this application.
Figure 6B:
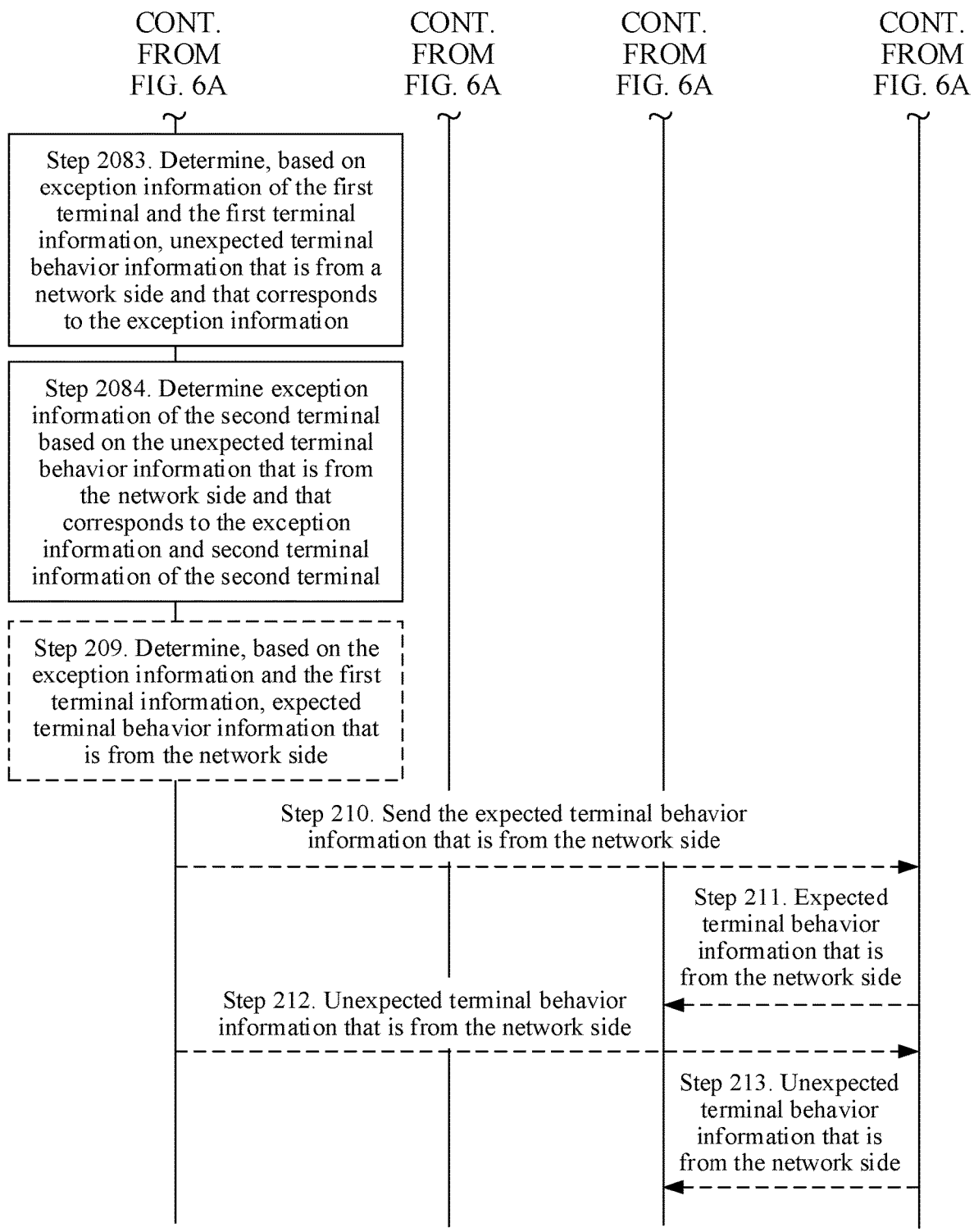

In a possible embodiment, as shown in FIG. 5B or FIG. 6B, the method provided in this embodiment of this application further includes the following step.

Step 209. The data analytics network element determines, based on the exception information and the first terminal information, expected terminal behavior information that is from the network side. The expected terminal behavior information that is from the network side is terminal behavior information that is in the first terminal information and that is not associated with the exception information.

It should be understood that, in step 209, the data analytics network element determines, based on the exception information, and the first terminal information of the first terminal on the one or more network elements, the expected terminal behavior information that is from the network side. The expected terminal behavior information that is from the network side is terminal behavior information that is in the first terminal information of the first terminal on the one or more network elements and that is not associated with the exception information.

The data analytics network element may perform data analysis on the dataset <normal type, first terminal information> in Table 5, to obtain the expected terminal behavior information that is from the network side.

For example, the data analytics network element may cluster <normal type, first terminal information> by using a K-means (K-Means) algorithm, where first terminal information corresponding to a centroid of each obtained category is the expected terminal behavior information that is from the network side.

The expected terminal behavior information that is from the network side includes one or more of the following information: a stationary indication, a terminal moving trajectory, a periodic communication indication, communication duration, a communication period, a scheduled communication time, a maximum packet transmission delay, a maximum packet transmission response time, a quantity of buffered packets, and at least one piece of second-type data.

In a possible implementation, the second-type data may be obtained after normalization processing. The normalization processing is mainly mapping a physical data value of each data type to a fixed value space by using a maximum-minimum normalization method, a Z-Score normalization method, or the like.

In the embodiments of this application, a first type and a second type may be the same or may be different. The first type is any type of terminal behavior data of a terminal that is obtained by the data analytics network element from a network element, and the second type is a type of data obtained after the data analytics network element analyzes terminal behavior data obtained by the network element.

The expected terminal behavior information that is from the network side further includes a terminal identifier, a terminal group identifier, or type information, and the type information includes a mobility category or a session category.

In another possible embodiment, as shown in FIG. 5B or FIG. 6B, after step 209, the method provided in this embodiment of this application may further include the following steps.

Step 210. The data analytics network element sends the expected terminal behavior information that is from the network side to a subscriber data management network element or a policy control network element.

For example, the data analytics network element may send the expected terminal behavior information that is from the network side to the subscriber data management network element by using an Nudm_ParameterProvision_Update request service operation, and the subscriber data management network element is configured to use the expected terminal behavior information that is from the network side as subscription data of the second terminal.

Step 211. The subscriber data management network element or the policy control network element sends the expected terminal behavior information that is from the network side to each of one or more network elements serving the second terminal.

In a process in which the second terminal registers with a core network, the subscriber data management network element or the policy control network element sends the expected terminal behavior information that is from the network side to each network element serving the second terminal.

It should be noted that, in this embodiment of this application, alternatively, the data analytics network element may directly send the expected terminal behavior information that is from the network side to each network element serving the second terminal.

In a possible embodiment, as shown in FIG. 5A, before step 2081, the method provided in this embodiment of this application further includes the following steps.

Step 2061. Each of the one or more network elements sends, to the data analytics network element, second terminal information that corresponds to the second terminal and that is on the respective network element.

For example, if a network element is an AMF network element, the AMF network element sends, to the data analytics network element, second terminal information that corresponds to the second terminal and that is on the AMF network element; if a network element is an SMF network element, the SMF network element sends, to the data analytics network element, second terminal information that corresponds to the second terminal and that is on the SMF network element.

In an example A, step 2061 in this embodiment of this application may be implemented in the following manner: Each network element receives a first request message from the data analytics network element, where the first request message is used to request second terminal information that corresponds to the second terminal and that is on the respective network element. In response to the first request message received by the network element, each network element sends, to the data analytics network element, the second terminal information that corresponds to the second terminal and that is on the respective network element.

For example, the first request message carries filtering information and event information. For specific terminal behavior data that the event information is used to indicate to collect, refer to Table 1. The filtering information is used to limit a range within which the terminal behavior data is to be collected. For example, the filtering information may include at least one of a terminal group identifier, area information, time information, and a terminal type.

Optionally, if a network element is a user plane network element, the data analytics network element may subscribe to, from the user plane network element via the session management network element, second terminal information that corresponds to the second terminal and that is on the user plane network element.

In another example B, step 2061 in this embodiment of this application may be implemented in the following manner: Each network element sends, to the data analytics network element according to a preset rule, second terminal information that corresponds to the second terminal and that is on the respective network element.

For example, the preset rule may be a preset period.

In still another example C, step 2061 in this embodiment of this application may be implemented in the following manner: Each network element determines, based on exception determining logic corresponding to the network element, that second terminal information that corresponds to the second terminal and that is on the respective network element is abnormal. In this case, each network element sends, to the data analytics network element, the second terminal information that corresponds to the second terminal and that is on the respective network element.

For example, the exception determining logic may be the similarity between the expected terminal behavior information that is from the network side and the second terminal information that corresponds to the second terminal and that is on the respective network element.

If the similarity between the second terminal information and the expected terminal behavior information that is from the network side is less than or equal to a third threshold, the network element determines that the second terminal information is abnormal.

For example, if a cosine value between a third vector $Vector_p$ corresponding to the second terminal information and a fourth vector $Vector_q$ corresponding to the expected terminal behavior information that is from the network side is less than a first parameter (for example, the first parameter may be 0.5), the network element determines that the similarity between the second terminal information and the expected terminal behavior information that is from the network side is less than or equal to the third threshold. Alternatively, if an included angle between a third vector $Vector_p$ and a fourth vector $Vector_q$ is greater than or equal to a first angle (for example, the first angle may be 30 degrees), the network element determines that the similarity between the second terminal information and the expected terminal behavior information that is from the network side is less than or equal to the third threshold. Specific values of the third threshold, the first angle, and the first parameter are not limited in the embodiments of this application.

For example, if the network element is an AMF network element, after determining, based on the expected terminal behavior information that is from the network side, that the second terminal information is abnormal, the AMF network element may send, to the data analytics network element, second terminal information that corresponds to the second terminal and that is on the AMF network element.

In addition, it should be noted that, after the data analytics network element receives second terminal information that corresponds to the second terminal, that is on a network element A, and that is reported by the network element A, the data analytics network element may further send the first request message to another network element different from the network element A in the one or more network elements, to indicate the another network element different from the network element A in the one or more network elements to report second terminal information that corresponds to the second terminal and that is on the another network element.

Step 2071. The data analytics network element receives, from each network element, second terminal behavior information that corresponds to the second terminal and that is on the respective network element.

In still another possible embodiment, as shown in FIG. 5B or FIG. 6B, after step 208, the method provided in this embodiment of this application may further include the following steps.

Step 212. The data analytics network element sends the unexpected terminal behavior information that is from the network side to the subscriber data management network element or the policy control network element.

Before step 212, the method provided in this embodiment of this application further includes: subscribing to, by the subscriber data management network element or the policy control network element from the data analytics network element by using an Nnwdaf_AnalyticsSubscription_Subscribe service operation, the unexpected terminal behavior information that is from the network side and that corresponds to the exception type. For details, refer to Table 6. It should be noted that a quantity of pieces of unexpected terminal behavior information that is from the network side is the same as a quantity of terminal types analyzed by the data analytics network element. A parameter type in the unexpected UE behavior parameters may be the same as or different from that in Table 2, and the only difference is that a value of the parameter type in the unexpected UE behavior parameters is different from that in the expected UE behavior parameters.

For example, the data analytics network element sends an Nnwdaf_AnalyticsSubsciption_Notify service operation to the subscriber data management network element or the policy control network element, where the Nnwdaf_AnalyticsSubsciption_Notify service operation carries the unexpected terminal behavior information that is from the network side, an identifier of the second terminal, the terminal group identifier, and the terminal type.

Step 213. The subscriber data management network element or the policy control network element sends the unexpected terminal behavior information that is from the network side to each of the one or more network elements serving the second terminal.

For example, in a registration process of the second terminal or a packet data unit (PDU) session establishment process, the subscriber data management network element or the policy control network element sends the unexpected UE behavior parameters to the one or more network elements (for example, AMF network elements, SMF network elements, or UPF network elements) serving the second terminal. It can be learned from Table 2 that different parameters in the unexpected UE behavior parameters correspond to different network elements. Therefore, the subscriber data management network element or the policy control network element may send the parameters to the corresponding network elements.

In a possible embodiment, as shown in FIG. 6A, before step 208, the method provided in this embodiment of this application further includes the following steps.

Step 2062. Each of the one or more network elements sends, to the data analytics network element, second terminal information that corresponds to the second terminal and that is on the respective network element.

For example, if a network element is an AMF network element, the AMF network element sends, to the data analytics network element, second terminal information that corresponds to the second terminal and that is on the AMF network element: if a network element is an SMF network element, the SMF network element sends, to the data analytics network element, second terminal information that corresponds to the second terminal and that is on the SMF network element.

For a specific implementation of step 2062, refer to the foregoing example A and example B.

In still another example D, step 2062 in this embodiment of this application may be implemented in the following manner: Each network element determines, based on exception determining logic corresponding to the network element, that second terminal information that corresponds to the second terminal and that is on the respective network element is abnormal. In this case, each network element sends, to the data analytics network element, the second terminal information that corresponds to the second terminal and that is on the respective network element.

For example, the exception determining logic may be the similarity between the unexpected terminal behavior information that is from the network side and the second terminal information that corresponds to the second terminal and that is on the respective network element.

If the similarity between the second terminal information and the unexpected terminal behavior information that is from the network side is greater than or equal to a fifth threshold, the network element determines that the second terminal information is abnormal.

For example, when an error between a second vector corresponding to the unexpected terminal behavior information that is from the network side and a third vector corresponding to the second terminal information is less than a first preset error, the similarity is greater than or equal to the fifth threshold. Alternatively, when an error between 0 and an included angle between a third vector corresponding to the second terminal information and a second vector corresponding to the unexpected terminal behavior information that is from the network side is less than a second preset error, the similarity is greater than or equal to the fifth threshold.

It should be noted that a difference between the example D and the example C lies in that: In the example C, if the network element determines that the similarity between the real-time second terminal information and the expected terminal behavior information that is from the network side is less than or equal to the third threshold, the network element can report, to the data analytics network element, the second terminal information that corresponds to the second terminal and that is on the network element. In the example D, once the network element finds that the similarity between the real-time second terminal information and the unexpected terminal behavior information that is from the network side is greater than or equal to the fifth threshold, the network element can report the second terminal information of the second terminal on the network element to the data analytics network element. In the example C, there are usually many pieces of second terminal information whose similarity with the expected terminal behavior information that is from the network side is less than or equal to the third threshold. However, after further detection by the data analytics network element, most pieces of second terminal information do not belong to any exception type.

Therefore, in the example D, a large amount of signaling for reporting the real-time second terminal information can be saved.

Step 2072. Same as step 2071, and details are not described herein again.

In another possible embodiment, with reference to FIG. 5A or FIG. 6A, before step 204, the method provided in this embodiment of this application further includes the following steps.

Step 200. The data analytics network element sends a second request message to the application function network element, where the second request message is used to request the exception information of the second terminal.

For example, the second request message may carry an event ID and an event filter. The event filter is used to indicate filtering information for data collection, and the filtering information includes at least one of a terminal group identifier, area information, time information, and terminal type information.

For example, the data analytics network element may send the second request message to the application function network element via an NEF network element. For example, the data analytics network element sends an Nnef_EventExposure_Subscribe service operation to the NEF network element. The NEF network element sends an Naf_Event-Exposure_Subscribe service operation to the application function network element. The Nnef_EventExposure_Subscribe service operation and the Naf_EventExposure_Subscribe service operation both carry the second request message. Optionally, if the application function network element is an AF network element (for example, a P-CSCF) managed and controlled by an operator, the data analytics network element may subscribe to data of a terminal on the AF network element.

The event ID is used to indicate specific data to be collected, as shown in the following Table 7:

TABLE 7

Data of a first terminal provided by an AF network element

| Data | Data Source | Function |
|---|---|---|
| Service identifier | AF network element | The service identifier is, for example, an application ID, or an IP triplet, and identifies a service corresponding to a service flow. The AF network element provides the information, to help the data analytics network element obtain, through supervised learning, an exception type of a service corresponding to a data flow of a terminal and a corresponding terminal behavior. Particularly, if a service server is attacked, all terminals that use a service on the service server are affected, and abnormal behaviors of these terminals may be consistent. Based on this, the NWDAF can learn behavior characteristic data corresponding to a service of a terminal, to assist in determining an exception type of the terminal. |
| IP 5-tuple | AF network element | Identifying a service flow of a terminal |
| Risk or exception information | AF network element | The risk or exception information indicates risk information or an exception type of a terminal, such as abnormal high bandwidth, a long-live flow, or a DDOS attack. The AF provides the information, to help the NWDAF obtain, through supervised learning, a terminal behavior corresponding to the exception type. For example, the exception type may be one or more of the following types: a DDOS attack (Suspicion of DDOS attack), an unexpected long-live flow (Unexpected long-live/large rate flows) |

TABLE 7-continued

Data of a first terminal provided by an AF network element

| Data | Data Source | Function |
|---|---|---|
| | | that is from a network side, an unexpected large rate flow (Unexpected long-live/large rate flows) that is from the network side, a wrong destination address, data theft, and an APT attack. |
| Terminal type | AMF network element, SMF network element, PCF network element, or UDM network element | The terminal type is used to identify a brand or a model of a mobile phone. For example, a type allocation code is in an IMEI or a PEI. Generally, UEs with a same TAC have same hardware and version characteristics. Therefore, the terminals may have same vulnerability and may be controlled by attackers using the same vulnerability. Therefore, if the NWDAF obtains the exception type and the corresponding terminal type through analysis, the network side may be assisted in processing an exception based on the terminal type. |

Step 201. The application function network element receives the second request message.

Step 202. The application function network element determines the data that corresponds to the first terminal and that is on the application function network element.

Step 203. The application function network element sends the data that corresponds to the first terminal and that is on the application function network element to the data analytics network element.

It should be noted that, after obtaining the data that corresponds to the first terminal and that is on the application function network element, the application function network element may proactively send the data that corresponds to the first terminal and that is on the application function network element to the data analytics network element. Certainly, the application function network element may alternatively send, as triggered by the second request message, the data that corresponds to the first terminal and that is on the application function network element to the data analytics network element. When the application function network element proactively sends the data, step 200 and step 201 may be omitted.

Correspondingly, step 204 may be implemented in the following manner: The data analytics network element receives, from the application function network element via the NEF network element, data of the second terminal on the application function network element. For example, the application function network element sends an Naf_EventExposure_Notify service operation to the NEF network element, and the data analytics network element receives an Nnef_EventExposure_Notify service operation sent by the NEF network element. The Naf_EventExposure_Notify service operation and the Nnef_EventExposure_Notify service operation carry at least the data of the second terminal on the application function network element.

The method provided in this embodiment of this application further includes: sending, by the data analytics network element, the exception information of the second terminal to the policy control network element or the application function network element.

For example, the data analytics network element sends the exception information of the second terminal to the policy control network element or the application function network element by using an Nnwdaf_AnalyticsSubscription_Notify service operation.

The foregoing mainly describes the solutions in the embodiments of this application from a perspective of interaction between network elements. It may be understood that, to implement the foregoing functions, the network elements such as the data analytics network element, the application function network element, and the network element each include a corresponding hardware structure and/or a software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the data analytics network element, the application function network element, and the network element may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that, in the embodiments of this application, the division into units is an example, and is merely a logical function division. In actual implementation, another division manner may be used.

The foregoing describes the methods in the embodiments of this application with reference to FIG. 4 to FIG. 6. The following describes terminal information processing apparatuses that are provided in the embodiments of this application and that perform the foregoing methods. A person skilled in the art may understand that the method and the apparatus may be combined and referenced with each other, and the terminal information processing apparatus provided in the embodiments of this application may perform the steps performed by the data analytics network element, the application function network element, or the network element in the foregoing terminal information processing methods.

An example in which each function module is obtained through division based on each corresponding function is used below for description.

Figure 7:
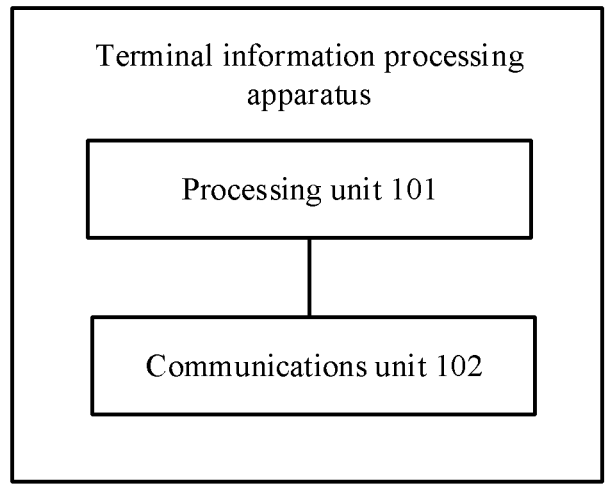
FIG. 7 is a schematic structural diagram of a terminal information processing apparatus according to an embodiment of this application.

When an integrated unit is used, FIG. 7 shows a terminal information processing apparatus used in the foregoing embodiments. The terminal information processing apparatus may include a processing unit 101 and a communications unit 102.

In an example, the terminal information processing apparatus is a data analytics network element, or a chip applied to a data analytics network element. In this case, the communications unit 102 is configured to support the terminal information processing apparatus in performing step 101 and step 102 that are performed by the data analytics network element in the foregoing embodiment. The processing unit 101 is configured to support the terminal information processing apparatus in performing step 103 performed by the data analytics network element in the foregoing embodiment.

In another example, the terminal information processing apparatus is a data analytics network element, or a chip applied to a data analytics network element. In this case, the communications unit 102 is configured to support the terminal information processing apparatus in performing step 204 and step 205 that are performed by the data analytics network element in the foregoing embodiment. The processing unit 101 is configured to support the terminal information processing apparatus in performing step 208 performed by the data analytics network element in the foregoing embodiment.

In a possible embodiment, the communications unit 102 is further configured to support the terminal information processing apparatus in performing step 200, step 210, step 2071, step 2072, step 210, and step 212 that are performed by the data analytics network element in the foregoing embodiment. The processing unit 101 is further configured to support the terminal information processing apparatus in performing step 2081, step 2082, step 2083, step 2084, and step 209 that are performed by the data analytics network element in the foregoing embodiment.

In still another example, the terminal information processing apparatus is an application function network element, or a chip applied to an application function network element. In this case, the communications unit 102 is configured to support the terminal information processing apparatus in performing step 203 performed by the application function network element in the foregoing embodiment. The processing unit 101 is configured to support the terminal information processing apparatus in performing step 202 performed by the application function network element in the foregoing embodiment.

In a possible implementation, the communications unit 102 is further configured to support the terminal information processing apparatus in performing step 201 performed by the application function network element in the foregoing embodiment.

In yet another example, the terminal information processing apparatus is a network element, or a chip applied to a network element. In this case, the processing unit 101 is configured to support the terminal information processing apparatus in performing the step, in the foregoing embodiment, of determining, by the network element, the first terminal information that corresponds to the first terminal and that is on the network element. The communications unit 102 is configured to support the terminal information processing apparatus in performing step 2061 or step 2062 that is performed by the network element in the foregoing embodiment.

The terminal information processing apparatus may further include a storage unit. The storage unit is configured to store computer program code, where the computer program code includes an instruction. If the terminal information processing apparatus is a chip applied to a data analytics network element, the storage unit may be a storage unit (for example, a register or a cache) in the chip, or may be a storage unit (for example, a read-only memory or a random access memory) that is located outside the chip and that is in the data analytics network element.

If the terminal information processing apparatus is a chip applied to an application function network element, the storage unit may be a storage unit (for example, a register or a cache) in the chip, or may be a storage unit (for example, a read-only memory or a random access memory) that is located outside the chip and that is in the application function network element.

If the terminal information processing apparatus is a chip applied to a network element, the storage unit may be a storage unit (for example, a register or a cache) in the chip, or may be a storage unit (for example, a read-only memory or a random access memory) that is located outside the chip and that is in the network element.

Figure 8:
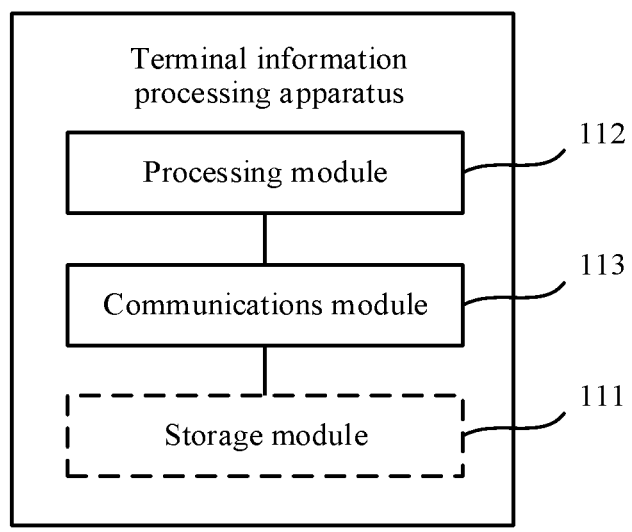
FIG. 8 is a schematic structural diagram of another terminal information processing apparatus according to an embodiment of this application.

When an integrated unit is used, FIG. 8 is a possible schematic diagram of a logical structure of a terminal information processing apparatus in the foregoing embodiment. The terminal information processing apparatus includes a processing module 112 and a communications module 113. The processing module 112 is configured to control and manage an action of the terminal information processing apparatus. For example, the processing module 112 is configured to perform a step of information/data processing in the terminal information processing apparatus. The communications module 113 is configured to support a step of information/data sending or receiving in the terminal information processing apparatus.

In a possible embodiment, the terminal information processing apparatus may further include a storage module 111, configured to store program code and data that may be used by the terminal information processing apparatus.

In an example, the terminal information processing apparatus is a data analytics network element, or a chip applied to a data analytics network element. In this case, the communications module 113 is configured to support the terminal information processing apparatus in performing step 101 and step 102 that are performed by the data analytics network element in the foregoing embodiment. The processing module 112 is configured to support the terminal information processing apparatus in performing step 103 performed by the data analytics network element in the foregoing embodiment.

In another example, the terminal information processing apparatus is a data analytics network element, or a chip applied to a data analytics network element. In this case, the communications module 113 is configured to support the terminal information processing apparatus in performing step 204 and step 205 that are performed by the data analytics network element in the foregoing embodiment. The processing module 112 is configured to support the terminal information processing apparatus in performing step 208 performed by the data analytics network element in the foregoing embodiment.

In a possible embodiment, the communications module 113 is further configured to support the terminal information processing apparatus in performing step 200, step 210, step 2071, step 2072, step 210, and step 212 that are performed by the data analytics network element in the foregoing embodiment. The processing module 112 is further configured to support the terminal information processing apparatus in performing step 2081, step 2082, step 2083, step 2084, and step 209 that are performed by the data analytics network element in the foregoing embodiment.

In still another example, the terminal information processing apparatus is an application function network element, or a chip applied to an application function network element. In this case, the communications module 113 is configured to support the terminal information processing apparatus in performing step 203 performed by the application function network element in the foregoing embodiment. The processing module 112 is configured to support the terminal information processing apparatus in performing step 202 performed by the application function network element in the foregoing embodiment.

In a possible implementation, the communications module 113 is further configured to support the terminal information processing apparatus in performing step 201 performed by the application function network element in the foregoing embodiment.

In yet another example, the terminal information processing apparatus is a network element, or a chip applied to a network element. In this case, the processing module 112 is configured to support the terminal information processing apparatus in performing the step, in the foregoing embodiment, of determining, by the network element, the first terminal information that corresponds to the first terminal and that is on the network element. The communications module 113 is configured to support the terminal information processing apparatus in performing step 2061 or step 2062 that is performed by the network element in the foregoing embodiment.

The processing module 112 may be a processor or a controller. For example, the processing module 112 may be a central processing unit, a general-purpose processor, a digital signal processor, an application-specific integrated circuit, a field programmable gate array or another programmable logic device, a transistor logic device, a hardware component, or any combination thereof. The controller/processor may implement or execute various example logical blocks, modules, and circuits described with reference to content disclosed in this document. Alternatively, the processor may be a combination of processors implementing a computing function, for example, a combination of one or more microprocessors, or a combination of the digital signal processor and a microprocessor. The communications module 113 may be a transceiver, a transceiver circuit, a communications interface, or the like. The storage module 111 may be a memory.

Figure 9:
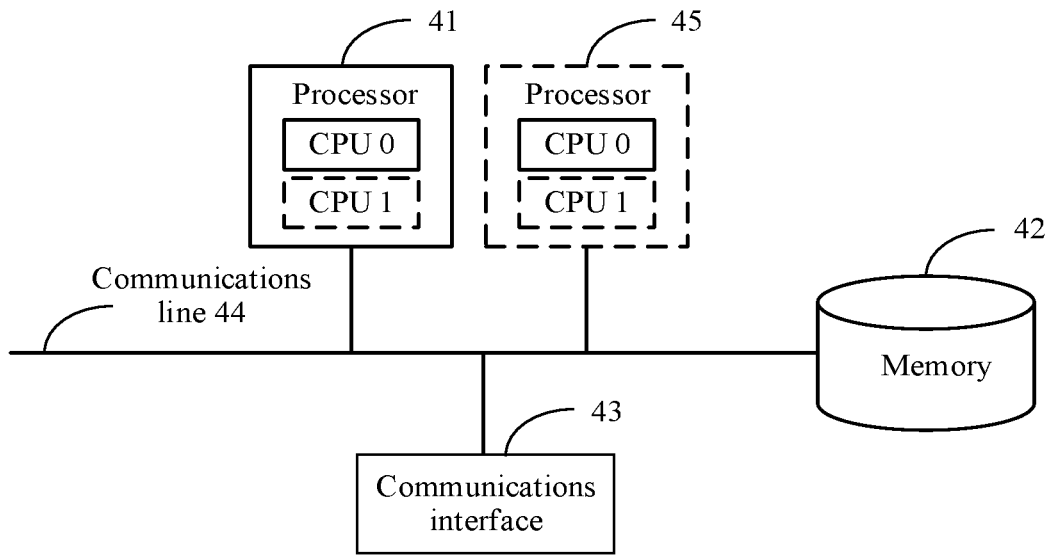
FIG. 9 is a schematic structural diagram of still another terminal information processing apparatus according to an embodiment of this application.

When the processing module 112 is a processor 41 or a processor 45, the communications module 113 is a communications interface 43 or a transceiver, and the storage module 111 is a memory 42, the terminal information processing apparatus in this application may be a communications device shown in FIG. 9. The communications device includes the processor 41, a communications line 44, and at least one communications interface (FIG. 9 is described merely by using an example in which the communications device includes the communications interface 43).

Optionally, the communications device may further include the memory 42.

The processor 41 may be a general-purpose central processing unit (CPU), a microprocessor, an application-specific integrated circuit (ASIC), or one or more integrated circuits for controlling program execution of the solutions of this application.

The communications line 44 may include a channel for transmitting information between the foregoing components.

The communications interface 43 is any apparatus such as a transceiver, and is configured to communicate with another device or a communications network such as the Ethernet, a radio access network (RAN), or a wireless local area network (WLAN).

The memory 42 may be a read-only memory (ROM) or another type of static storage device that can store static information and an instruction, or a random access memory (RAM) or another type of dynamic storage device that can store information and an instruction. The memory 42 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), or magnetic disk storage medium or another magnetic storage device, or any other medium that can be used to carry or store expected program code in a form of an instruction or a data structure and that is accessible by a computer, but is not limited thereto. The memory may exist independently, and is connected to the processor through the communications line 44. The memory may be integrated with the processor.

The memory 42 is configured to store a computer-executable instruction for performing the solutions in this application, and the processor 41 controls execution of the computer-executable instruction. The processor 41 is configured to execute the computer-executable instruction stored in the memory 42, to implement the terminal information processing method provided in the foregoing embodiments of this application.

Optionally, the computer-executable instruction in this embodiment of this application may also be referred to as application program code, and this is not specifically limited in this embodiment of this application.

During some implementations, in an embodiment, the processor 41 may include one or more CPUs, for example, a CPU 0 and a CPU 1 in FIG. 9.

During some implementations, in an embodiment, the communications device may include a plurality of processors, such as the processor 41 and the processor 45 in FIG. 9. Each of the processors may be a single-core (single-CPU) processor, or may be a multi-core (multi-CPU) processor. The processor herein may refer to one or more devices, circuits, and/or processing cores configured to process data (for example, a computer program instruction).

In an example, the communications device shown in FIG. 9 is a data analytics network element, or a chip applied to a data analytics network element. In this case, the communications interface 43 is configured to support the communications device shown in FIG. 9 in performing step 101 and step 102 that are performed by the data analytics network element in the foregoing embodiment. The processor 41 or the processor 45 is configured to support the communications device in performing step 103 performed by the data analytics network element in the foregoing embodiment.

In another example, the communications device shown in FIG. 9 is a data analytics network element, or a chip applied to a data analytics network element. In this case, the communications interface 43 is configured to support the communications device shown in FIG. 9 in performing step 204 and step 205 that are performed by the data analytics network element in the foregoing embodiment. The processor 41 or the processor 45 is configured to support the communications device in performing step 208 performed by the data analytics network element in the foregoing embodiment.

In a possible embodiment, the communications interface 43 is further configured to support the communications device in performing step 200, step 210, step 2071, step 2072, step 210, and step 212 that are performed by the data analytics network element in the foregoing embodiment. The processor 41 or the processor 45 is further configured to support the communications device in performing step 2081, step 2082, step 2083, step 2084, and step 209 that are performed by the data analytics network element in the foregoing embodiment.

In still another example, the communications device shown in FIG. 9 is an application function network element, or a chip applied to an application function network element. In this case, the communications interface 43 is configured to support the communications device shown in FIG. 9 in performing step 203 performed by the application function network element in the foregoing embodiment. The processor 41 or the processor 45 is configured to support the communications device in performing step 202 performed by the application function network element in the foregoing embodiment.

In a possible implementation, the communications interface 43 is further configured to support the communications device in performing step 201 performed by the application function network element in the foregoing embodiment.

In yet another example, the communications device shown in FIG. 9 is a network element, or a chip applied to a network element. In this case, the processor 41 or the processor 45 is configured to support the communications device shown in FIG. 9 in performing the step, in the foregoing embodiment, of determining, by the network element, the first terminal information that corresponds to the first terminal and that is on the network element. The communications interface 43 is configured to support the communications device shown in FIG. 9 in performing step 2061 or step 2062 that is performed by the network element in the foregoing embodiment.

Figure 10:
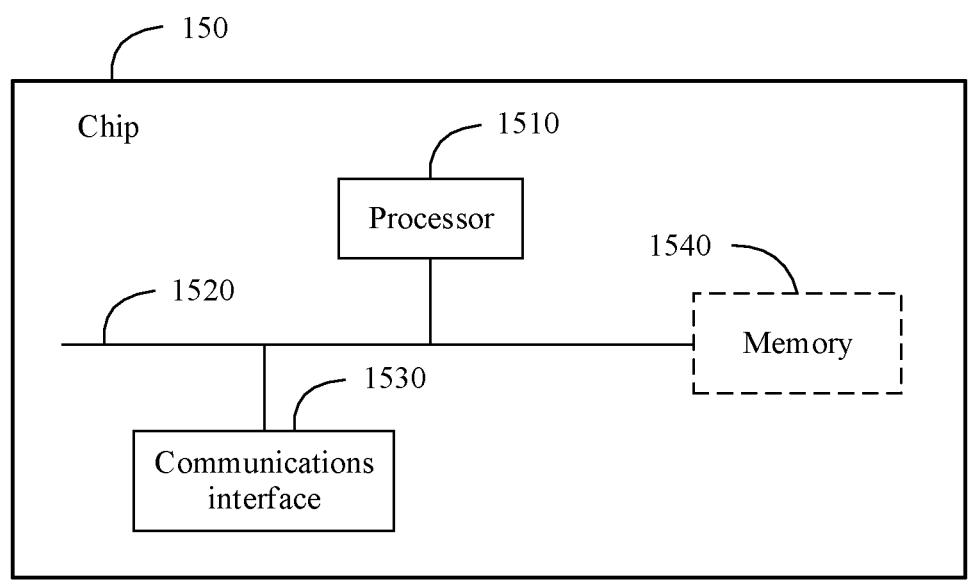
FIG. 10 is a schematic structural diagram of a chip according to an embodiment of this application.

FIG. 10 is a schematic structural diagram of a chip 150 according to an embodiment of this application. The chip 150 includes one or more (including two) processors 1510 and a communications interface 1530.

Optionally, the chip 150 further includes a memory 1540. The memory 1540 may include a read-only memory and a random access memory, and provide an operation instruction and data for the processor 1510. A part of the memory 1540 may further include a non-volatile random access memory (NVRAM).

In some implementations, the memory 1540 stores the following elements, an execution module or a data structure, or a subset thereof, or an extended set thereof.

In this embodiment of this application, a corresponding operation is performed by invoking the operation instruction (the operation instruction may be stored in an operating system) stored in the memory 1540.

In a possible implementation, structures of chips used by a data analytics network element, a network element, and an application function network element are similar, and different apparatuses may use different chips to implement respective functions.

The processor 1510 controls a processing operation of any one of the data analytics network element, the network element, and the application function network element. The processor 1510 may also be referred to as a central processing unit (CPU).

The memory 1540 may include a read-only memory and a random access memory, and provide an instruction and data to the processor 1510. A part of the memory 1540 may further include a non-volatile random access memory (NVRAM). For example, in an application, the memory 1540, the communications interface 1530, and the memory 1540 are coupled together through a bus system 1520, where the bus system 1520 may further include a power bus, a control bus, a status signal bus, and the like in addition to a data bus. However, for clear description, various types of buses in FIG. 10 are marked as the bus system 1520.

The methods disclosed in the foregoing embodiments of this application may be applied to the processor 1510, or may be implemented by the processor 1510. The processor 1510 may be an integrated circuit chip and has a signal processing capability. In an implementation process, steps in the foregoing methods can be implemented by using a hardware integrated logical circuit in the processor 1510, or by using instructions in a form of software. The processor 1510 may be a general-purpose processor, a digital signal processor (DSP), an application-specific integrated circuit (ASIC), a field-programmable gate array (FPGA) or another programmable logical device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and accomplished by a hardware decoding processor, or may be performed and accomplished by a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor.

In a possible implementation, the communications interface 1530 is configured to perform receiving and sending steps of any one of the data analytics network element, the network element, and the application function network element in the embodiments shown in FIG. 4 to FIG. 6B. The processor 1510 is configured to perform a processing step of any one of the data analytics network element, the network element, and the application function network element in the embodiments shown in FIG. 4 to FIG. 6B.

The foregoing communications unit may be an interface circuit or a communications interface of the apparatus, and is configured to receive a signal from another apparatus. For example, when the apparatus is implemented as a chip, the communications unit is an interface circuit or a communications interface that is of the chip and that is configured to receive a signal from another chip or apparatus or send a signal to another apparatus.

In the foregoing embodiment, the instruction that is stored in the memory and that is to be executed by the processor may be implemented in a form of a computer program product. The computer program product may be written into the memory in advance, or may be downloaded in a form of software and installed in the memory.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive, SSD), or the like. According to an aspect, a computer-readable storage medium is provided.

The computer-readable storage medium stores an instruction, and when the instruction is run, a data analytics network element or a chip applied to a data analytics network element is enabled to perform step 101, step 102, and step 103 in the foregoing embodiment.

According to another aspect, a computer-readable storage medium is provided. The computer-readable storage medium stores an instruction, and when the instruction is run, a data analytics network element or a chip applied to a data analytics network element is enabled to perform step 204, step 205, step 208, step 200, step 210, step 2071, step 2072, step 210, step 212, step 2081, step 2082, step 2083, step 2084, and step 209 in the foregoing embodiment.

According to still another aspect, a computer-readable storage medium is provided. The computer-readable storage medium stores an instruction, and when the instruction is run, an application function network element or a chip applied to an application function network element is enabled to perform step 201, step 202, and step 203 in the foregoing embodiment.

According to yet another aspect, a computer-readable storage medium is provided. The computer-readable storage medium stores an instruction, and when the instruction is run, a network element or a chip applied to a network element is enabled to perform step 2061 and step 2062 in the foregoing embodiment.

The foregoing readable storage medium may include any medium that can store program code, such as a USB flash drive, a removable hard disk, a read-only memory, a random access memory, a magnetic disk, or an optical disc.

According to an aspect, a computer program product including an instruction is provided. The computer program product stores the instruction, and when the instruction is run, a data analytics network element or a chip applied to a data analytics network element is enabled to perform step 101, step 102, and step 103 in the foregoing embodiment.

According to another aspect, a computer program product including an instruction is provided. The computer program product stores the instruction, and when the instruction is run, a data analytics network element or a chip applied to a data analytics network element is enabled to perform step 204, step 205, step 208, step 200, step 210, step 2071, step 2072, step 210, step 212, step 2081, step 2082, step 2083, step 2084, and step 209 in the foregoing embodiment.

According to still another aspect, a computer program product including an instruction is provided. The computer program product stores the instruction, and when the instruction is run, an application function network element or a chip applied to an application function network element is enabled to perform step 201, step 202, and step 203 in the foregoing embodiment.

According to yet another aspect, a computer program product including an instruction is provided. The computer program product stores the instruction, and when the instruction is run, a network element or a chip applied to a network element is enabled to perform step 2061 and step 2062 in the foregoing embodiment.

According to an aspect, a chip is provided, where the chip is applied to a data analytics network element. The chip includes at least one processor and a communications interface, the communications interface is coupled to the at least one processor, and the processor is configured to run an instruction to perform step 101, step 102, and step 103 in the foregoing embodiment.

According to another aspect, a chip is provided, where the chip is applied to a data analytics network element. The chip includes at least one processor and a communications interface, the communications interface is coupled to the at least one processor, and the processor is configured to run an instruction to perform step 204, step 205, step 208, step 200, step 210, step 2071, step 2072, step 210, step 212, step 2081, step 2082, step 2083, step 2084, and step 209 in the foregoing embodiment.

According to an aspect, a chip is provided, where the chip is applied to an application function network element. The chip includes at least one processor and a communications interface, the communications interface is coupled to the at least one processor, and the processor is configured to run an instruction to perform step 201, step 202, and step 203 in the foregoing embodiment.

According to another aspect, a chip is provided, where the chip is applied to a network element. The chip includes at least one processor and a communications interface, the communications interface is coupled to the at least one processor, and the processor is configured to run an instruction to perform step 2061 or step 2062 in the foregoing embodiment.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, definitely, various modifications and combinations may be made to them without departing from the scope of this application. Correspondingly, the specification and accompanying drawings are merely example description of this application defined by the accompanying claims, and is considered as any of or all modifications, variations, combinations or equivalents that cover the scope of this application. Definitely, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A terminal information processing method, comprising:
  obtaining, by a data analytics network element, first terminal exception information of a first terminal from an application function network element, the first terminal exception information comprising an exception identifier and an exception level, the exception identifier identifies an exception type, and the exception level reflects an exception degree of the exception type:
    obtaining, by the data analytics network element, first terminal behavior information of the first terminal on one or more network elements; and
    determining, by the data analytics network element, second terminal exception information of a second terminal based on the first terminal exception information and the first terminal behavior information.

2. The method according to claim 1, wherein the determining the second terminal exception information of the second terminal based on the first terminal exception information and the first terminal behavior information comprises:
  determining, by the data analytics network element, terminal classification information based on the first terminal exception information and the first terminal behavior information; and
  determining, by the data analytics network element, the second terminal exception information based on the terminal classification information and second terminal behavior information of the second terminal.

3. The method according to claim 2, wherein the method further comprises:
  determining, by the data analytics network element based on the first terminal exception information and the first terminal behavior information, expected terminal behavior information from the network side, wherein the expected terminal behavior information from the network side is terminal information that is in the first terminal information and that is not associated with the first terminal exception information.

4. The method according to claim 3, wherein the method further comprises:
  sending, by the data analytics network element, the expected terminal behavior information to a network element serving the second terminal.

5. The method according to claim 4, wherein the method further comprises:
  receiving, by the data analytics network element from the network element serving the second terminal, the second terminal behavior information being received when a similarity between the behavior information of the second terminal and the expected terminal behavior information is smaller than or equal to a threshold.

6. The method according to claim 4, wherein the network element serving the second terminal is an access and mobility management function network element or a session management function network element.

7. The method according to claim 1, wherein the method further comprises:
sending, by the data analytics network element, the exception information of the second terminal to a policy control network element or to the application function network element.

8. The method according to claim 1, wherein the exception information further comprises additional information, wherein
the additional information indicates description information of the exception type.

9. The method according to claim 1, wherein the method further comprises:
obtaining, by the data analytics network element, an internet protocol (IP) 5-tuple for associating the exception information and the behavior information of the first terminal.

10. A communications apparatus, comprising: a memory storing instructions; and a processor in communication with the memory, the processor executes the instructions to cause the communications apparatus to:
obtain first terminal exception information of a first terminal from an application function network element, the first terminal exception information comprising an exception identifier and an exception level, the exception identifier identifies an exception type, and the exception level reflects an exception degree of the exception type;
obtain first terminal behavior information of the first terminal on one or more network elements; and
determine second terminal exception information of a second terminal based on the first terminal exception information and the first terminal behavior information.

11. The communications apparatus according to claim 10, wherein determining the second terminal exception information of the second terminal based on the first terminal exception information and the first terminal behavior information comprises:
determine terminal classification information based on the first terminal exception information and the first terminal behavior information; and
determine the second terminal exception information of the second terminal-based on the terminal classification information and second terminal behavior information of the second terminal.

12. The communications apparatus according to claim 11, wherein the processor further executes the instructions to cause the communications apparatus to:
determine, based on the first terminal exception information and the first terminal behavior information, expected terminal behavior information from the network side, wherein the expected terminal behavior information from the network side is terminal information that is in the first terminal information and that is not associated with the exception information.

13. The communications apparatus according to claim 12, wherein the processor further executes the instructions to cause the communications apparatus to:
send the expected terminal behavior information to a network element serving the second terminal.

14. The communications apparatus according to claim 13, wherein the processor further executes the instructions to cause the communications apparatus to:
receive, from the network element serving the second terminal, the second terminal behavior information when a similarity between the second terminal behavior information and the expected terminal behavior information is smaller than or equal to a threshold.

15. The communications apparatus according to claim 13, wherein the network element serving the second terminal is an access and mobility management function network element or a session management function network element.

16. The communications apparatus according to claim 10, wherein the processor further executes the instructions to cause the communications apparatus to:
send the second terminal exception information of the second terminal to a policy control network element or to the application function network element.

17. The communications apparatus according to claim 10, wherein the exception information further comprises additional information, wherein the additional information indicates description information of the exception type.

18. The communications apparatus according to claim 10, wherein the processor further executes the instructions to cause the communications apparatus to:
obtain an internet protocol (IP) 5-tuple for associating the first terminal exception information and the first terminal behavior information.

19. A non-transitory computer readable storage medium storing computer-executable instructions, which when executed by a processor, cause the processor to:
obtain first terminal exception information of a first terminal from an application function network element, the first terminal exception information comprising an exception identifier and an exception level, the exception identifier identifies an exception type, and the exception level reflects an exception degree of the exception type;
obtain first terminal behavior information of the first terminal on one or more network elements; and
determine second terminal exception information of a second terminal based on the first terminal exception information and the first terminal behavior information.

20. The non-transitory computer readable storage medium according to claim 19, wherein the determining the second terminal exception information of the second terminal based on the first terminal exception information and the first terminal behavior information comprises:
determine terminal classification information based on the first terminal exception information and the first terminal behavior information; and
determine the second terminal exception information of the second terminal based on the terminal classification information and second terminal behavior information of the second terminal.

* * * * *